United States Patent Office
3,113,139
Patented Dec. 3, 1963

3,113,139
SILICON-PHOSPHORUS COMPOUNDS
Gail H. Birum and George A. Richardson, Dayton, Ohio, assignors to Monsanto Chemical Company, St. Louis, Mo., a corporation of Delaware
No Drawing. Filed Nov. 18, 1959, Ser. No. 853,704
29 Claims. (Cl. 260—346.1)

The present invention relates to new organic compounds containing both silicon and phosphorus.

It is an objective of this invention to provide new and useful organic compounds containing both silicon and phosphorus. It is a further object of this invention to provide methods of making new organic compounds containing both silicon and phosphorus. It is also an object of this invention to provide new organic compounds of silicon and phosphorus for use in motor fuels.

According to one method of the invention we have discovered that by reacting a silicon compound having at least one halogen atom selected from the group consisting of chlorine and bromine linked to the silicon atom, an aldehydic or ketonic carbonyl compound, and a trivalent phosphorus ester compound which has at least one alkoxy or haloalkoxy group linked to the phosphorus atom, silicon compounds containing phosphinylhydrocarbyloxy radicals can be produced. The phosphinylhydrocarbyloxy silicon compounds so prepared have the general formula

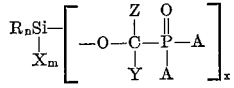

where $n$ is a whole number from 0 to 3, $m$ is a whole number from 0 to 3, $x$ is a whole number from 1 to 4, and the sum total of $n+m+x$ is always equal to 4, R is selected from the group consisting of hydrogen, and hydrocarbyl-, halohydrocarbyl-, hydrocarbyloxy-, halohydrocarbyloxy-, hydrocarbylthio-, and halohydrocarbylthio- radicals wherein the hydrocarbyl group has from 1 to 12 carbons and which may be saturated or unsaturated, and wherein two R's taken together stand for a member of the group consisting of bivalent hydrocarbylene radicals of from 4 to 6 carbon atoms in the ring and a total of from 4 to 12 carbon atoms, and bivalent —Ohydrocarbylene0— radicals having from 2 to 4 carbon atoms in the ring and a total of from 2 to 12 carbon atoms; X is bromine or chlorine; Y is selected from the group consisting of hydrogen and hydrocarbyl radicals of from 1 to 12 carbon atoms when $n$ is zero to 1 furyl- and thienyl- radicals, and said radicals containing a substituent selected from the group consisting of halogen, cyano-, —Oalkyl, —Salkyl, and —COOalkyl where alkyl has from 1 to 5 carbon atoms, and when $n$ is 2 to 3, Y is selected from the group consisting of hydrogen, and hydrocarbyl radicals of from 1 to 17 carbon atoms, furyl and thienyl radicals, and said radicals carrying a substituent selected from the group consisting of halogen, cyano, —Oalkyl, —Salkyl and —COOalkyl where alkyl has from 1 to 5 carbon atoms; Z is selected from the class consisting of hydrogen and the methyl radical and is methyl only when Y is an alkyl radical of from 1 to 2 carbon atoms, and Y and Z taken together complete a cycloalkane ring having 5 to 6 carbon atoms in the ring and a total of from 5 to 10 carbon atoms; and each A is selected from the group consisting of hydrocarbyl, hydrocarbyloxy, halohydrocarbyl, and halohydrocarbyloxy radicals which contain from 1 to 12 carbon atoms.

In this specification, the symbol T as used in a chemical formula represents a member of the group consisting of alkyl and haloalkyl radicals of from 1 to 12 carbon atoms and is derived from the trivalent phosphorus ester used in the reaction to prepare the compounds of this invention and represents the alkyl portion of the alkyl halide given off as a by-product of the reaction.

The number of phosphinylhydrocarbyloxy groups present in the compounds of the invention depends upon the number of halogen atoms attached to the silicon atom in the halogen-containing silicon reactant which are replaced. When only one halogen is thus attached, a product containing one phosphinylhydrocarbyloxy group is obtained as follows:

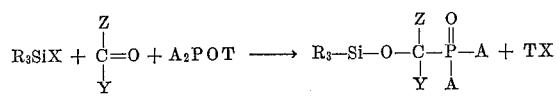

When two halogen atoms are attached to the silicon atom, they can both be replaced by using two moles each of carbonyl compound and trivalent phosphorus ester. Thus, the reaction may be:

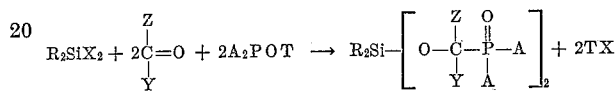

wherein the product contains two phosphinylhydrocarbyloxy groups, or by using only one molar proportion each of carbonyl compound and trivalent phosphorus ester, the reaction may be as follows:

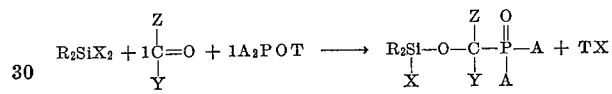

wherein the product contains one halogen attached to the silicon atom and one phosphinylhydrocarbyloxy group. When three halogen atoms are attached to the silicon atom, all three may react as follows:

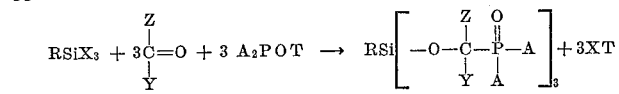

where the product contains three phosphinylhydrocarbyloxy groups, or the reaction may be limited to replacement of two halogen atoms.

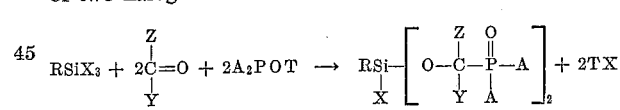

to give a product containing one halogen atom attached to the silicon atom and two phosphinylhydrocarbyloxy groups, or to replacement of one halogen atom,

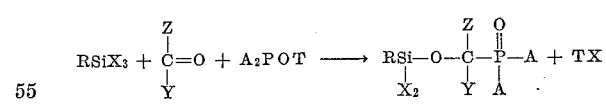

to give a product containing two halogen atoms attached to the silicon atom, and one phosphinylhydrocarbyloxy group, each reaction being accomplished by controlling the molar proportions of carbonyl compound and trivalent phosphorus esters that are used to replace the halogen atoms. When four halogen atoms are attached to the silicon atom, the reaction can be:

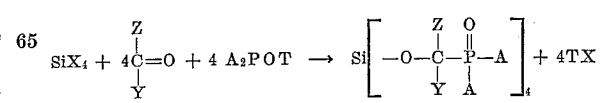

where the product contains four phosphynylhydrocarbyloxy groups. Or the reaction can be controlled to obtain products having only 1, 2 or 3 of the halogens attached to the silicon atoms replaced as in the above cases by controlling the molar proportions of carbonyl compound and trivalent phosphorus ester used. For example,

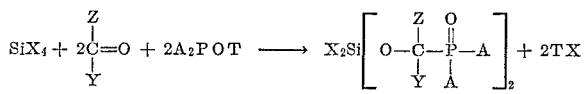

wherein the product has two halogens and two phosphinyl-hydrocarbyloxy groups.

Among the silicon halide reactants that can be used in this invention are compounds covered by the following general formulae:

| | |
|---|---|
| $SiX_4$ | $(R'S)(XR')SiX_2$ |
| $R'SiX_3$ | $R'(XR'O)SiX_2$ |
| $R'OSiX_3$ | $R'(XR'S)SiX_2$ |
| $R'SSiX_3$ | $R'O(XR'S)SiX_2$ |
| $XR'SiX_3$ | $R'O(XR'O)SiX_2$ |
| $XR'OSiX_3$ | $(R'S)(XR'S)SiX_2$ |
| $XR'SSiX_3$ | $R'_3SiX$ |
| $R'_2SiX_2$ | $(R'O)_3SiX$ |
| $(R'O)_2SiX_2$ | $(R'S)_3SiX$ |
| $(R'S)_2SiX_2$ | $R'_2(R'O)SiX$ |
| $R'(R'O)SiX_2$ | $R'_2(R'S)SiX$ |
| $R'(R'S)SiX_2$ | $R'(R'O)_2SiX$ |
| $(R'O)(R'S)SiX_2$ | $R'(R'S)_2SiX$ |
| $(XR')_2SiX_2$ | $R'(R'O)(R'S)SiX$ |
| $(XR'O)_2SiX_2$ | $(R'O)_2(R'S)SiX$ |
| $(XR'S)_2SiX_2$ | $(R'S)_2(R'O)SiX$ |
| $R'(XR')SiX_2$ | $R'_2(XR')SiX$ |
| $(R'O)(XR')SiX_2$ | $(R'O)_2(XR'O)SiX$ | where R' represents hydrocarbyl radicals of from 1 to 12 carbon atoms, XR' represents halohydrocarbyl radicals of from 1 to 12 carbon atoms, and X represents chlorine or bromine. The hydrocarbyl radicals may be aliphatic or aromatic; they may be saturated or unsaturated. Examples of hydrocarbyl radicals included in the above definition are alkyl, alkenyl, alkynyl, cycloalkyl, aryl, alkaryl, aralkyl, and their halogen derivatives. The above list of silicon halide reactants is not exhaustive of all variations but is intended only to show how the silicon valences may be satisfied for use in this invention.

Compounds of the formula

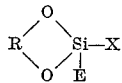

wherein R is a bivalent hydrocarbylene radical selected from the group consisting of alkylene radicals of from 2 to 4 carbons in the ring and a total of from 2 to 12 carbon atoms, and arylene radicals of from 6 to 12 carbons having bonds of adjacent carbon atoms in the aryl ring attached to the oxygen atoms, and halogen substitution products thereof, E is a radical selected from the group consisting of hydrogen, R', R'O, R'S, XR', XR'O, XR'S defined earlier in the specification, and X is bromine or chlorine, may also be used as the silicon halide reactant.

Other useful silicon halide reactants include cyclic compounds of the formula

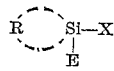

where R is a bivalent hydrocarbylene radical selected from the group consisting of alkylene radicals of from 4 to 6 carbon atoms in the ring and a total of from 4 to 12 carbon atoms, E is a radical selected from the group consisting of hydrogen, R', R'O, R'O, XR', XR'O, XR'S defined earlier in the specification, and X is bromine or chlorine.

Examples of the silicon halides of the formula $SiX_4$ that can be used in the present invention are, of course, silicon tetrabromide, silicon tetrachloride and the bromochlorosilanes.

Examples of compounds of the formula $RSiX_3$ which are useful in this invention are tribromo- and trichlorosilanes and any of the following: methyl-, ethyl-, n-propyl-, isopropyl-, n-butyl-, isobutyl-, amyl-, isoamyl-, n-hexyl-, n-heptyl-, decyl-, undecyl-, 2-ethylhexyl-, propenyl-, hexenyl-, vinyl-, allyl-, 4-heptenyl-, propynyl-, heptynyl-, decynyl-, cyclopentyl-, cyclohexyl-, and cycloheptyltribromo- or -trichlorosilane and such radicals substituted with one or more atoms of halogen.

Examples of the presently useful alkoxy, alkenyloxy, alkynyloxy, haloalkyloxy, haloalkenyloxy, and haloalkynyloxytrihalosilanes are methoxy-, ethoxy-, vinyloxy-, n-propoxy-, isopropoxy-, allyloxy-, propynyloxy-, n-butoxy-, isobutoxy-, tert-butoxy-, 2-butenyloxy-, amyloxy-, isoamyloxy-, n-hexyloxy-, 5-hexenyloxy-, n-heptyloxy-, n-heptynyloxy-, n-octyloxy-, 2-ethylhexyloxy-, isononyloxy-, n-decyloxy-, n-undecyloxy-, n-dodecyloxy-, 11-dodecenyloxy-, 2-chloroethoxy-, 5-chloro-2-pentynyloxy-, 2-fluoroethoxy-, tetrachlorobutoxy-, 2-chloropropoxy-, 5-chloropentyloxy-, tribromopropoxy-, 2-iodopropoxy-, dichlorododecyloxy-, 6,6-dichloro-7-octenyloxy- or trichlorohexyloxytrichloro- or -tribromosilane.

Examples of the presently useful cycloalkyl or halocycloalkyltrichlorosilanes are cyclohexyl-, cyclopentyl-, 2-methylcyclopentyl-, 4-isopropylcyclohexyl-, 2,4-dichlorocyclopentyl-, 2 - bromocyclohexyl-, 2 - fluorocyclopentyl-, 2-iodo-4-methylcyclohexyl, or tetrachlorocyclohexyltrichloro- and -tribromosilanes.

Examples of the benzenoid trihalosilanes useful in this invention are phenyl-, α- or β-naphthyl-, 4-biphenylyl-, o-, m-, or p-tolyl-, p-ethylphenyl-, dibutylphenyl-, mesityl-, cumyl-, o-, m-, or p-pentylphenyl-, benzyl-, 2-phenylethyl-, 4 - isopropylbenzyl-, or α - naphthylmethyltrichloro- and -tribromosilane.

Compounds of the formula $R'SSiX_3$ are hydrocarbylthiotrihalosilanes and halohydrocarbylthiotrihalosilanes in which the hydrocarbyl group is as defined above. Such compounds are, e.g., the alkylthio-, alkenylthio-, and alkynylthiotrihalosilanes such as ethylthio-, 2-pentenylthio-, 4-octynylthio-, n-butylthio-, or 2-ethylhexylthiotrichloro- or -tribromosilane; the cycloalkylthio- esters such as cyclohexylthio-, 2-methylcyclopentylthio-, or 2,4-dimethylcyclohexylthiotrichloro- or -tribromosilane; the haloalkyl-, haloalkenyl-, haloalkynyl-, or halocycloalkylthio- esters such as 2-chloroethylthio-, 3-iodopropylthio-, 3,3-dibromopropylthio-, 2-fluoroethylthio-, 6-chloro-3-hexylthio-, 8,8,8-trichlorooctylthio-, 10-bromo-8-dodecynylthio-, 6-bromododecylthio-, 2-chlorocyclohexylthio- or tribromocyclopentylthiotrichloro- or -tribromosilane. The benzenoid thiotrihalosilanes such as phenylthiotrichloro- or -tribromosilane, β - ethyl - 2 - naphthylthiotrichlorosilane, benzylthiotribromosilane, 4-biphenylylthiotrichlorosilane, etc. may also be used.

The benzenoidoxy- or -thiotrihalosilanes may contain one or more halogen substituents in either the aromatic ring thereof, at an aliphatic group which is attached to the aromatic ring, or at both the aromatic ring and said aliphatic group. Examples of such halogen-substituted compounds are 2-, 3-, and 4-chlorophenylthiotrichlorosilanes,
3,4,5- or 2,3,4-trichlorophenylthiotrichlorosilane,
pentachlorophenylthiotribromosilane,
β-bromo-naphthylthiotribromosilane,
4-(trifluoromethyl)phenylthiotrichlorosilane,
p-chlorobenzylthiotribromosilane,
4-(iodophenyl)phenylthiotrichlorosilane, and
octachlorobiphenylylthiotrichlorosilane.

Compounds of the formulae $R'_2SiX_2$, $R'(R'O)SiX_2$, $R'(R'S)SiX_2$, $(R'O)_2SiX_2$, $(R'S)_2SiX_2$, and $R'S(R'O)SiX_2$ in which R' is as defined above in detail for compounds of the formulae $R'SiX_3$, $R'OSiX_3$, and $R'SSiX_3$ may also be used in this invention. A few examples of such compounds are dihydrocarbyl or bis(halohydrocarbyl)dichloro- or -dibromosilanes, dihydrocarbyloxy- or bis(halohydrocarbyloxy)dichloro- or -dibromosilanes, and the dihydrocarbylthio- or bis(halohydrocarbylthio)dichloro- or -dibromosilanes.

A few examples of aliphatic dihalosilanes which are suited for the present purpose are dihydrocarbyl- and the dihydrocarbyloxydichloro- and -dibromosilanes, i.e., compounds of the formula (alkyl)$_2$SiX$_2$     (alkyl-O—)$_2$SiX$_2$
(alkenyl)$_2$SiX$_2$     (alkenyl-O)$_2$SiX$_2$
(alkynyl)$_2$SiX$_2$     (alkynyl-O)$_2$SiX$_2$ in which the alkyl, alkenyl, and alkynyl radicals have from 1 to 12 carbon atoms and X is chlorine or bromine. For example, dimethyl-, diethyl-, diisopropyl-, bis(2-propynyl)- di-n-butyl, dimethoxy-, diethoxy-, diisopropoxy-, bis(2-propynyloxy)-, di-n-butyloxy, di-tert-butyl-, di-n-amyl, diisoamyl-, di-tert-butyloxy-, di-n-amyloxy-, diisoamyloxy-, di-n-hexyl-, bis(2-hexenyl)-, di-n-heptyl-, bis-(2-ethylhexyl)-, di-n-hexloxy-, bis(2-hexenyloxy)-, di-n-heptyloxy-, bis(2-ethylhexloxy)-, di-n-octyl-, diisononyl-, bis(9-nonynyl)-, di-n-octyloxy-, diisononyloxy-, bis(9-nonynyloxy)-, di-n-decyl-, di-n-undecyl-, di-n-dodecyl-, di-tert-dodecyl, di-n-decyloxy, di-n-undecyloxy-, di-n-dodecyloxy-, or ditert-dodecyloxydichloro- or -dibromosilane or the mixed esters such as propylbutoxydichlorosilane, ethoxymethoxydichlorosilane, n-octyloxy-n-propoxydibromosilane, hexylhexyloxydichlorosilane, tert-amyloxy-n-dodecyloxydichlorosilane, 3-butenyloxyhexyloxybromochlorosilane, etc. may be used.

The alkyl radical of the dialkyl-, dialkyloxy-, dialkenyl-, dialkenyloxy-, dialkynyl- and dialkynyloxydichloro- and -dibromosilanes may contain one or more halogen atoms. Examples of such compounds are the simple esters such as bis(2-chloropropyl)-, bis(2-chloroethoxy)-, bis(2-bromopropyl)-, bis(3-bromopropoxy)-, bis(6-chloro-2-hexenyl)-, bis(6-chloro-2-hexenyloxy)-, bis(2-chloroheptyl)-, bis(4,4-dichlorooctyloxy)-, bis(2-fluoroethoxy)-, bis(2,4-dibromo-5-heptynyloxy)-, or bis(2-bromo-2-chloroethoxy)dichloro- or -dibromosilanes, and the mixed esters of both paraffinic and haloparaffinic alcohols such as (3-chloropropyl)ethyldibromosilane, (2-chloroethoxy)methoxydichlorosilane, or (2-chloropropoxy)ethoxydibromosilane.

The corresponding dialkylthio-, dialkenylthio-, and dialkynylthiodihalosilanes which are presently useful are compounds of the formulae (alkyl-S)$_2$SiX$_2$
(alkenyl-S)$_2$SiX$_2$
(alkynyl-S)$_2$SiX$_2$ wherein alkyl, alkenyl, and alkynyl and X are as defined above. Such compounds are, e.g., bis(methylthio)-, bis(ethylthio)-, bis(n-butylthio)-, bis(4-pentenylthio)-, bis-(2-ethylhexylthio)-, bis(dodecylthio)-, bis(2-propynylthio)ethylthiomethylthio-, methylthio-n-octylthio-, or isopropylthiomethylthiodichlorosilane or -dibromosilane. Examples of the presently useful simple or mixed haloalkylthioesters are bis(2-chloroethylthio)-, bis(3-fluoropropylthio)-, bis(4,4-dichloro-3-pentenylthio)-, or methylthiotrichlorobutylthiodichloro- or dibromosilane.

A few examples of aromatic dihydrocarbyl silicon halides useful in the present invention are: diphenyl-, di-p-tolyl-, di-o-, m-, or p-xylyl, dimesityl-, dibiphenylyl-, phenylnaphthyl-, phenylbenzyl-, (4-ethylphenyl)-p-tolyl-dichloro- and -dibromosilanes.

A class of aromatic silicon halides which are suited for the present purpose are the benzenoid dihydrocarbyloxydihalosilanes, i.e., compounds of the formula (Ar—O)$_2$SiX$_2$ in which Ar is a benzenoid hydrocarbyl radical which contains from 6 to 12 carbon atoms and X is chlorine or bromine. Such compounds may be diaryloxy-, bis(alkaryloxy)-, bis(aralkyloxy)-, aryloxyalkaryloxy-, aryloxyaralkyloxy-, alkaryloxyaralkyloxydibromo- or -dichlorosilanes, e.g., diphenoxy-, di-p-tolyloxy-, di-α- or β-naphthyloxy-, dibipenylyloxy-, dimesityloxy-, dicumyloxy-, bis-(2-butylphenoxy)-, phenoxy-2-naphthyloxy-, diphenyloxyphenoxy-, (4-ethylphenoxy)phenoxy-, dibenzyloxy-, (2-ethylphenoxy)benzyloxy-, bis(2ethylphenoxy)-, benzyloxyphenoxy-, biphenyloxy(4-ethylbenzyloxy)-, (3-phenylpropoxy)mesityloxy-, or β-naphthyloxyphenoxydichloro- or dibromosilane.

The corresponding benzenoid dihydrocarbylthio dihalosilanes, i.e., compounds of the formula (Ar—S)$_2$SiX$_2$ wherein Ar and X are as defined above, are similarly valuable for the present purpose. Such compounds are, for example, bis(phenylthio)dichlorosilane,
bis(benzylthio)dibromosilane,
bis(β-naphthylthio)dichlorosilane,
biphenylylthio(phenylthio)dichlorosilane,
benzylthio(α-naphthylmethylthio)dibromosilane,
(p-tolylthio)-2-phenylethylthiodichlorosilane, etc.

Mixed hydrocarbylhalosilanes, halohydrocarbylhalosilanes, hydrocarbylthiohalosilanes and halohydrocarbylthiohalosilanes are likewise useful in the present invention. Such compounds are, for example, methylphenyldichlorosilane,
(2-propenyl)-p-tolyldichlorosilane,
(2-chloroethyl)-β-naphthyldibromosilane,
(benzylthio)ethylthiodibromosilane,
(2-chlorophenyl)-4-butynyldichlorosilane,
(n-butyl)cyclohexylthiodichlorosilane,
(2-ethylhexyl)-2,3-dichlorophenylthiodichlorosilane, etc.

Examples of hydrocarbylhydrocarbyloxyhalosilanes, i.e., compounds of the formula R′(R′O)SiX$_2$ are the following:

ethylethoxydichlorosilane,
vinylpropoxydibromosilane,
phenylhexyloxydichlorosilane,
mesitylphenoxydichlorosilane,
(3-butynyl)-4-pentenyldichlorosilane,
cyclohexylethoxydibromosilane,
1-butoxycyclohexyldichlorosilane, and
α-naphthylpropynyloxydichlorosilane.

These compounds may have halogen substituted in one or both hydrocarbyl groups. For example, (2,2-dichloropropyl)-2-chloro-4-pentynyloxydichlorosilane, and
(2-bromo-α-naphthyl)-2,4,6-tribromophenoxydibromosilane, etc., may be used.

Also presently useful are the hydrocarbyloxyhydrocarbylthiodichlorosilanes, i.e., compounds of the formula $$\underset{\underset{\text{R'SSiX}_2}{|}}{\text{OR'}}$$

where X and R′ are as defined above. Such compounds are, for example, phenoxyphenylthio-,
propenoxybutynylthio-,
methoxyphenylthio-,
β-naphthyloxy-β-naphthylthio-,
ethoxyethylthio-,
m-tolyloxy-m-tolylthio-,
4-chlorophenoxybiphenylylthio-,
2-methyl-α-naphthyloxyphenylthio,
O-β-naphthylmethyl-S-phenyl-,
O-heptyl-S-(3-cycloalkenyl)-,
heptyloxy(3-cyclohexenylthio)-, or
butoxy-p-cumylthiodichloro- or dibromosilane.

A very valuable class of halosilanes useful in this invention are the monochlorosilanes which term includes the trihydrocarbyl, trihydrocarbyloxy, and trihydrocarbylthiomonohalosilanes and their halogen substitution products as well as the compounds monochlorosilane (H₃SiCl)

and monobromosilane (H₃SiBr). Examples of such compounds are triethylchlorosilane,
triphenylchlorosilane,
tri-p-tolyloxychlorosilane,
tricyclohexylthiochlorosilane,
tris(2-ethylhexyloxy)chlorosilane,
2-ethylphenoxyphenylthiophenylchlorosilane,
2-chlorobenzylthiobiphenylyloxybenzylchlorosilane,
dodecyloxydiphenylchlorosilane,
diethylvinylbromosilane.

Examples of the presently useful cyclic 1,3-dioxahalosilanes of the formulae

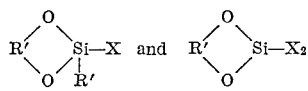

are 1-chloro-1-methyl-2,5-dioxasilacyclohexane,
1-bromo-1-phenyl-2,4-dioxasilacyclopentane,
1-chloro-1-allyl-2,6-dioxasilacycloheptane,
1-bromo-1-butynyl-2,5-dioxasilacyclohexane,
1,1-dichloro-2,4-dioxasilacyclopentane,
1,1-dibromo-2,4-dioxasilacyclopentane,
1-bromo-1-chloro-2,6-dioxacycloheptane,
1-chloro-1-dodecyloxy-2,5-dioxa-4-silacyclohexene, and the pyrocatechol ester of chloro(2-chloroethyl)-silanediol.

Examples of the silacycloalkane and silacycloalkene compounds useful in this invention are 1-chlorosilacyclobutane,
1-bromo-3-silacyclohexene,
1-chloro-1-ethoxysilacycloheptane,
1-bromo-1-phenylthio-4,4-dimethylsilacyclohexane, and
1,4,4-trichloro-1-methylsilacyclohexane.

Any of the above described halogen containing silicon compounds can be reacted with an aldehydic or ketonic carbonyl and a trivalent phosphorus ester which has at least one alkoxy or haloalkoxy group linked to the phosphorus atom to give phosphorus containing esters of silicon compounds. Useful carbonylic compounds are generally aldehydes of from 1 to 18 carbon atoms and ketones of from 3 to 4 carbon atoms. Aldehydes appear to participate in the reaction more readily than ketones. Of course, mixtures of carbonyl compounds may also be used. The presently useful aldehydes have the formula $$Y-\overset{O}{\underset{\|}{C}}-H$$

in which Y is selected from the group consisting of hydrogen and hydrocarbyl radicals of from 1 to 12 carbon atoms when $n$ is zero to 1, furyl- and thienyl-radicals, said radicals containing a substituent selected from the group consisting of halogen, cyano-, —Oalkyl, —Salkyl, and —COOalkyl, where alkyl has from 1 to 5 carbon atoms, and when $n$ is 2 to 3, Y is selected from the group consisting of hydrogen and hydrocarbyl radicals of from 1 to 17 carbon atoms, furyl and thienyl radicals, and said radicals carrying a substituent selected from the group consisting of halogen, cyano, —Oalkyl, —Salkyl, and —COOalkyl where alkyl has from 1 to 5 carbon atoms.

Owing to their easy availability, a particularly useful class of aldehydes includes the aliphatic aldehydes of from 1 to 18 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, palmitaldehyde, stearaldehyde, etc.

The presence of cyano, halogen, alkoxy, carboalkoxy, and alkylthio substituents in the aldehyde has no effect on the course of the reaction; hence, there may be employed such substituted aldehydes as 3-cyanopropionaldehyde,
chloroacetaldehyde,
3-butoxybutyraldehyde,
4-cyano-2,2-dimethylbutyraldehyde,
2,3-dichloropropionaldehyde,
3-isopropoxypropionaldehyde,
3-(ethylthio)-3-methylbutyraldehyde,
2-methyl-3-fluoropropionaldehyde,
dichlorolauraldehyde,
ethyl 11-formylundecanoate,
succinaldehydic acid methyl ester,
ethyl-4-formylbutyrate,
iodoacetaldehyde,
dichloroacetaldehyde,
chloral, etc.

Presently useful alicyclic carboxaldehydes include cyclohexanecarboxaldehyde,
6-methyl-3-cyclohexenecarboxaldehyde,
2-cyclohexene-1-carboxaldehyde,
cyclopentanecarboxaldehyde,
3-isopropyl-1-methylcyclohexanecarboxaldehyde,
5-ethoxy-2-cyclopentene-1-carboxaldehyde,
1-bromo-2,2,6-trimethylcyclohexanecarboxaldehyde,
2,2,6-trimethylcyclohexanecarboxaldehyde,
2,6-diethyl-2-cyclohexenecarboxaldehyde, etc.

Examples of unsaturated aliphatic and aromatic aldehydes which may be used in this invention are: acrolein, methylacrolein, crotonaldehyde, cinnamaldehyde, and undecenaldehyde.

The presently useful benzenoid aldehydes may be aliphatic-aromatic or purely aromatic aldehydes which may or may not be further substituted, e.g., benzaldehyde,
o-, m-, or p-tolualdehyde,
phenylacetaldehyde,
1- or 2-naphthylaldehyde,
biphenyl-4-carboxaldehyde,
hydrocinnamaldehyde,
2,3-dichlorobenzaldehyde,
4-formylacetanilide,
piperonol,
2-, 3-, or 4-butoxybenzaldehyde,
p-(ethoxy)benzaldehyde,
3,4-dipropoxybenzaldehyde,
4-(n-butylthio)benzaldehyde,
o-, m-, or p-iodobenzaldehyde,
3,4- or 3,5-dibromobenzaldehyde,
5-tert-butyl-m-tolualdehyde,
2-p-cymenecarboxaldehyde,
6-methoxy-2-naphthaldehyde,
biphenylcarboxaldehyde,
6-methoxy-3-biphenylcarboxaldehyde, etc.

The presently useful aldehyde may also be a heterocyclicaldehyde such as 2- or 3-furaldehyde,
5-acetamido-2-furaldehyde,
5-bromo- or chloro-2-furaldehyde,
5-methyl-2-furaldehyde,
2- or 3-thiophenecarboxaldehyde,
3,5-dimethyl-2-thiophenecarboxaldehyde,
2,5-dichloro-3-thiophenecarboxaldehyde,
2,5-diethyl-3-thiophenecarboxaldehyde, etc.

Ketones, generally, are not as active as the aldehydes in reacting with the silicon halide compound and the trivalent phosphorus ester. While a wide variety of aldehydes react with said mixture according to the present process, only the lower dialkyl ketones and cyclohexanone appear to undergo the reaction. Useful dialkyl ketones are acetone and ethyl methyl ketone.

Trivalent phosphorus esters which are generally useful with the carbonylic compounds and silicon halides described above are either simple or mixed phosphites, phosphonites, and phosphinites having at least one alkoxy or haloalkoxy radical containing from 1 to 12 carbon atoms. Examples of useful phosphite compounds are trimethyl, triethyl, triisopropyl, tri-n-propyl, tri-n-butyl, tri-tert-amyl, tri-n-hexyl, tri-n-heptyl, tris(2-ethylhexyl), tri-n-octyl, trinonyl, tridecyl, triundecyl, tri-tert-dodecyl, amyl diethyl, butyl di-n-propyl, n-dodecyl dimethyl, ethyl octyl propyl, tris(2-chloroethyl), tris(3-chloropropyl), tris(2-chloropropyl), tris(3,4-dichlorobutyl), tris(2-bromoethyl), tris(2-fluoroethyl), tris(dichlorododecyl), 2-chloroethyl diethyl, 3-bromopropyl bis(2-chloroethyl), diamyl trichlorooctyl, 2-chloroethyl, 3-chloropropyl, 4-chlorobutyl, 2-chloroethyl methyl propyl, tris(2,3-dichloropropyl), diphenyl methyl, di(-p-tolyl) ethyl, and di(α-naphthyl) 2-chloroethyl phosphites. Examples of phosphonite compounds are dimethyl methylphosphonite, di-n-propyl propylphosphonite, diethyl amylphosphonite, ethyl octyl propylphosphonite, diethyl 2-chloropropylphosphonite, dinonyl dichloromethylphosphonite, 2-chloroethyl butyl propylphosphonite, dibutyl phenylphosphonite, and ethyl benzyl benzylphosphonite. Examples of phosphinite compounds are methyl dimethylphosphinite, isopropyl diethylphosphinite, n-hexyl n-hexyloctylphosphinite, 2-chloroamyl diethylphosphinite, ethyl octylpropylphosphinite, propyl methylethylphosphinite, methyl diphenylphosphinite, and methyl phenylbenzylphosphinite. Mixtures of phosphite, phosphonite, and phosphinite esters may also be used.

When formaldehyde is reacted with silicon tetrachloride or silicon tetrabromide and a trialkyl or trihaloalkyl phosphite, for example, the products prepared may be either tetra[(dialkoxyphosphinyl)methyl] silicates or tetra{[bis(haloalkoxy)phosphinyl]methyl} silicates. Similarly when the reactants are formaldehyde, silicon tetrachloride and an alkyl or haloalkyl phosphonite or phosphinite the products prepared may be tetra[(alkoxyalkylphosphinyl)methyl] silicates, tetra[(haloalkoxyalkylphosphinyl)methyl] silicates, tetra[(alkoxyhaloalkylphosphinyl)methyl] silicates, tetra[(dialkylphosphinyl)methyl] silicates, or tetra[(dihaloalkylphosphinyl)methyl] silicates, respectively, depending upon the presence and position of the halogen atoms in the alkyl groups.

Silicon tetrachloride or tetrabromide reacts with four moles of alkanecarboxaldehyde and four moles of a trialkyl phosphite to give tetra[1-(dialkoxyphosphinyl)alkyl] silicates, i.e., compounds of the formula

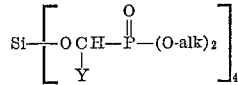

where Y is an alkyl radical of from 1 to 12 carbon atoms and alk denotes an alkyl radical of from 1 to 12 carbon atoms. Thus, reaction of one mole of silicon tetrachloride with four moles of acetaldehyde and four moles of tri-n-butyl phosphite gives tetra[1-(di-n-butoxyphosphinyl)ethyl] silicate, i.e., a compound of the above formula in which Y is methyl and alk is n-butyl. Other compounds of the above formula which are prepared according to the present process are, e.g.

Tetra[1-(dimethoxyphosphinyl)ethyl] silicate
Tetra[1-(diethoxyphosphinyl)undecyl] silicate
Tetra[1-(di-n-octyloxyphosphinyl)2-methylpropyl] silicate
Tetra[1-(didodecyloxyphosphinyl)propyl] silicate Tris(haloalkyl) phosphites react with silicon tetrachloride or tetrabromide and an alkane carboxaldehyde to give tetra(1-[bis(haloalkoxy)phosphinyl]alkyl) silicates in the same manner as above. Thus, reaction of tris(2-chloroethyl) phosphite with propionaldehyde and silicon tetrachloride gives Tetra(1-[bis(2-chloroethoxy)phosphinyl]propyl) silicate.

When the aldehyde is benzaldehyde, the products with silicon tetrachloride or tetrabromide and dialkyl alkylphosphonites are tetra[α-(alkoxyalkylphosphinyl)-benzyl] silicates, i.e., compounds of the formula

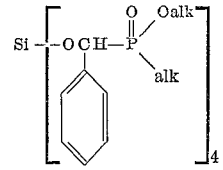

wherein alk is an alkyl radical of from 1 to 12 carbon atoms.

Reaction between cycloalkanecarboxaldehydes, silicon tetrachloride or tetrabromide and alkyl dialkylphosphinites gives compounds such as tetra[(diethylphosphinyl)cyclohexylmethyl] silicate, which is obtained from cyclohexanecarboxaldehyde, ethyl diethylphosphinite, and silicon tetrachloride or tetrabromide.

As herein disclosed, the lower dialkyl ketones such as acetone or ethyl methyl ketone react as do the hydrocarbyl aldehydes in preparing the phosphinyl silanes. Products thus obtained with trialkyl phosphites and silicon tetrahalides have the formula

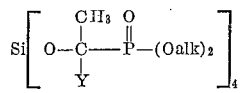

where Y is an alkyl radical of from 1 to 2 carbon atoms, and alk denotes an alkyl or haloalkyl radical of from 1 to 12 carbon atoms. Thus, acetone, trimethyl phosphite, and silicon tetrachloride or tetrabromide give tetra[2-(dimethoxyphosphinyl)-2-propyl] silicate, i.e., a compound in which both Y and alk are methyl. Employing a tris(haloalkyl) phosphite instead of the trialkyl phosphite, there are obtained, e.g., tetra{2-[bis(2-chloroethoxy)phosphinyl]-2-propyl} silicate from acetone, tris(2-chloroethyl) phosphite and silicon tetrachloride; and tetra{2-[bis(2-bromopropyl)phosphinyl]-2-butyl} silicate from ethyl methyl ketone, tris(2-bromopropyl) phosphite, and silicon tetrabromide.

One mole of silicon tetrachloride or tetrabromide reacts with three moles of alkanecarboxaldehyde and three moles of dialkyl alkylphosphonite ester to give tris[1-(alkoxyalkylphosphinyl)alkoxy]halosilanes, i.e., com-compounds of the formula

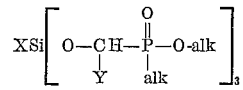

where Y is an alkyl radical of from 1 to 12 carbon atoms, alk denotes an alkyl radical of from 1 to 12 carbon atoms, and X is bromine or chlorine.

Similarly one mole of silicon tetrachloride or tetrabromide reacts with two moles of alkanecarboxaldehyde and two moles of an alkoxy dialkylphosphinite ester to give bis[1-(dialkylphosphinyl)alkoxy]dihalosilanes, i.e., compounds of the formula

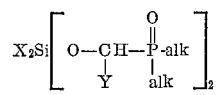

where Y is an alkyl radical of from 1 to 12 carbon atoms, alk is an alkyl radical of from 1 to 12 carbon atoms, and X is bromine or chlorine.

If silicon tetrachloride or tetrabromide is treated with only one mole of aldehyde and one mole of a trivalent phosphorus ester, only one halogen atom attached to the silicon will be replaced in the manner indicated above.

Examples of compounds produced by replacing only one, two or three halogen atoms in silicon tetrachloride in the above manner are:

1-(diethoxyphosphinyl)propoxytrichlorosilane,
2-(phenoxyphenylphosphinyl)benzyloxytrichlorosilane,
Bis(1-dihexylphosphinyl)cyclohexyloxytribromosilane,
Bis[1-(dodecyloxyphenylphosphinyl)ethoxy]-dichlorosilane,
Bis[α-(phenoxyphenylphosphinyl)-p-methylbenzyloxy]dichlorosilane,
Tris{(1-[4-chlorobutoxy)phosphinyl]heptyloxy})-chlorosilane,
Tris[α-(ethoxyethylphosphinyl)furfuryloxy]bromosilane, and
Tris[2-(phenylphenoxyphosphinyl)propoxy]-chlorosilane.

Reaction of formaldehyde and a trialkyl phosphite with tribromo-, trichloro-, dibromo-, dichloro-, monobromo- or monochlorosilane or a derivative thereof wherein at least one of the hydrogen atoms bonded to silicon is replaced by any of the groups R′, R′O, R′S, XR′, XR′O, XR′S defined above yields the corresponding tris-, bis-, or mono[(dialkoxyphosphinyl)methoxy]silane when all of the halogen is replaced, i.e., compounds of the formulae

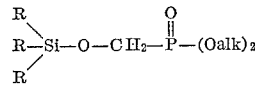

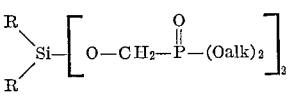

and

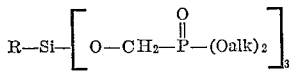

where R is as defined above, and alk represents an alkyl group of from 1 to 12 carbon atoms as in the trialkyl phosphite starting material. It is understood that one or more haloalkyl radicals of from 1 to 12 carbon atoms may be substituted for the alkyl radicals in the above given structural formulae.

When phosphonite and phosphinite esters are used in place of phosphite esters, the reaction is similar. Thus, the reaction of trichlorosilane, propionaldehyde, and diethyl ethylphosphonite gives tris[1 - (ethoxyethylphosphinyl)propoxy]silane, i.e. a compound having the formula

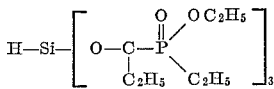

More examples of reaction products of trichloro- or tribromosilane, carbonyl compounds, and alkyl, haloalkyl, or mixed alkyl haloalkyl phosphites, phosphonites, and phosphinites are:

Tris[1-(dipentyloxyphosphinyl)octyloxy]-3-chloropropylsilane,
Tris[1-(nonyloxydecylphosphinyl)butoxy]-ethylsilane,
Tris[1-(butoxypropoxyphosphinyl)propoxy]-dichloromethylsilane,
Tris[α-(diethoxyphosphinyl)benzyloxy]-2-naphthylsilane,
Tris{α-[bis(2-chloropropxy)phosphinyl]thenyloxy}-vinylsilane.

Examples of reaction products of trichloro- or tribromosilane compounds, carbonyl compounds and phosphite, phosphonite, and phosphinite esters which have benzenoid radicals attached to the phosphorus atom are:

Tris[1-ethoxyphenylphosphinyl)propoxy]ethylsilane
Tris{1-[bis(2-phenylethoxy)phosphinyl]ethoxy}-4-bromobutylsilane,
Tris[1-(p-tolyloxy-p-tolylphosphinyl)heptyloxy]-amylsilane,
Tris{[bis(2-chloro-α-napththyl)phosphinyl]-methoxy}cyclohexylsilane,
Tris[1-(diphenylphosphinyl)-3-phenyl-2-propenyloxy]-2-chlorophenylsilane.

By treating tribromo- or trichlorosilane compounds with carbonyl compounds and trivalent phosphorus esters in the molar proportion of 1:2:2, respectively, products of the formula

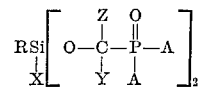

where A, R, X, Y, and Z are as defined above, are prepared. Similarly, by treating tribromo- or trichlorosilane compounds with carbonyl compounds and trivalent phosphorus esters in the molar proportion of 1:1:1, respectively, products of the formula

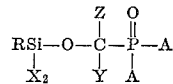

where A, R, X, Y, and Z are as defined above, are prepared. Examples of such compounds are:

Bis[1-dibutoxyphosphinyl)cyclohexloxy]hexylchlorosilane,
Bis{(1-[bis(2-chloroethoxy)phosphinyl]propoxy})-phenylthiobromosilane,
Bis[α-hexylphenoxyphosphinyl)benzyloxy]-α-naphthylchlorosilane,
[(Heptyloxyheptylphosphinyl)(cyclohexy)methoxy]-decyldichlorosilane,
[Bis(p-tolyloxy)phosphinyl]methoxy-5,5-dichloroamyldibromosilane,
1-[bis(4-chlorophenyl)phosphinyl]-4-hexenyloxyallyldichlorosilane.

Examples of the reaction products involving the reaction between a dichloro- or dibromosilane compound, a carbonyl compound, and an alkyl or haloalkyl trivalent phosphorus ester where all of the halogen attached to the silicon atom is replaced are:

Bis[1-(diethoxyphosphinyl)ethoxy]dimethylsilane,
Bis[1-(dimethoxyphosphinyl)propoxy]chloromethylmethylsilane,
Bis[1-diethoxyphosphinyl)ethoxy]-2-naphthylethylsilane,
Bis[1-(didodecyloxyphosphinyl)butoxy]dibiphenylylsilane,
Bis[α-(hexyloxyethylphosphinyl)benzyloxy]diethylthiosilane,
Bis{1-[bis(2-chloropropoxy)phosphinyl]pentyloxy}dibenzyloxysilane,
Bis[1-(diethylphosphinyl)-p-tolyloxy]ethylcyclohexylsilane,
1,1-bis[1-(dinonyloxyphosphinyl)-6-cyanohexyloxy]silacyclopentane,
Bis[2-(dihexyloxyphosphinyl)propoxy]diethylsilane,
Bis[2-(didecyloxyphosphinyl)furfuryloxy]ethylallylsilane,
Bis[1-(bromopropoxychloropropoxyphosphinyl)-4-carbethoxybutoxy]methyl-2-naphthylsilane, and
1-{bis[1-(diundecyloxyphosphinyl)ethoxy]}-2,5-dioxasilacyclohexane Examples of reaction products involving the reaction between dichloro- or dibromosilane compounds, carbonyl compounds, and phosphite, phosphonite, or phosphinite compounds having one or two aromatic radicals attached to the phosphorus atom are:

Bis[1-(methoxyphenylphosphinyl)ethoxy]bis(2-chloropropyl)silane,
Bis{1-[bis(4-chlorophenyl)phosphinyl]propoxy}diethylsilane,
Bis[1-(2,4-xylyloxy-2,4-xylylphosphinyl)-nonyloxy]bis(2-chlorobutylthio)silane,
Bis[2-(diphenoxyphosphinyl)-propoxy]methoxymethylthiosilane.

Where the reaction between the dibromo- or dichlorosilane compound, the carbonyl compound, and the trivalent phosphorus ester takes place in the molor ratio of 1:1:1, respectively, the product will have the formula

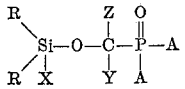

where A, R, X, Y, and Z are as defined above. Examples of such products are:

{1-[(4-bromobutoxy)butylphosphinyl]pentyloxy}didodecylchlorosilane,
[1-(methoxyphenoxyphosphinyl)-2-propenyloxy]chloromethylethylchlorosilane, and
[1-(dihexylphosphinyl)-4-cyanobutoxy]bis(ethylthio)bromosilane.

Examples of compounds of this invention which are made by reacting a monochloro- or monobromosilane compound, i.e., compounds having the structure $$R_3Si—X$$

where each of the three R groups on the silicon atom is satisfied by any one of the members of the group consisting of hydrogen, R', R'O, R'S, XR', XR'O, XR'S as defined above, a carbonyl compound, and a trivalent phosphorus ester, said carbonyl compound and trivalent phosphorus ester being as defined above, are:

[1-(diethoxyphosphinyl)ethoxy]triethylsilane,
{1-[bis(2-bromopropoxy)phosphinyl]-2-phenylethoxy}tripropylsilane,
[1-(octyloxyoctylphosphinyl)-3-phenyl-2-propenyloxy]dipropylthiopropylsilane,
{1-[(2-bromoethyl)heptylphosphinyl]-(6-methyl-3-cyclohexenyl)methoxy}-1-methylsilacyclohexane,
[1-(decyloxydodecyloxyphosphinyl)-2,2,2-trichloroethoxy]triphenylthiosilane,
[1-(dihexylphosphinyl)-3-methyl-2-propenoxy]-2-naphthylbis-(2-chloropropylthio)silane,
{1-[bis(2,2-dibromobutoxy)phosphinyl]piperonyloxy}tris(3-chloropropyl)silane,
{1-[bis(2-chlorohexyloxy)phosphinyl]-2-butenyloxy}-2,4-dichlorobenzyldimethylsilane,
[1-(diethoxyphosphinyl)cyclohexyloxy]trimethylsilane, and
[1-(2-chloroethoxy-3,5-dichloropentoxyphosphinyl)octadecyloxy]-bis(chloroethyl)chloromethylsilane Examples of reaction products of monochloro- or monobromosilane, a carbonyl compound, and a trivalent phosphorus ester compound having one or two aromatic radicals attached to the phosphorus atom are:

{1-[methoxy(2-methylphenyl)phosphinyl]undecyloxy}triphenylthiosilane,
{1-[bis(p-isopropylphenylmethyl)phosphinyl]propoxy}2,4-dichlorobenzylthiodimethylsilane, and
[1-(phenoxyphenylphosphinyl)propoxy]diethylvinylsilane.

As indicated above, products of this invention can be prepared by mixing and reacting a trivalent phosphorus ester, a monochloro- or monobromosilane, and an aliphatic aldehyde having a substituent therein. When said mixture consists of tris(2-chloroethyl) phosphite and tris(2-chloroethyl)chlorosilane, there are obtained with the substituted aliphatic aldehydes shown below, 1-[bis(2-chloroethoxy)phosphinyl] - D - tris(2-chloroethyl)silanes where —D— represents the substituted hydrocarbyloxy radical derived from the given aldehyde:

| Aldehyde— | —D— |
|---|---|
| 2,3-dichloropropionaldehyde | 2,3-dichloropropoxy. |
| 4-cyanobutyraldehyde | 4-cyanobutoxy. |
| 3-ethylthiopropionaldehyde | 3-ethylthiopropoxy. |
| 8-methoxyoctanal | 8-methoxyoctyloxy. |
| 10-fluorodecanal | 10-fluorodecyloxy. |
| Phenoxyacetaldehyde | 2-phenoxyethoxy. |
| 2-chlorobenzaldehyde | 2-chlorobenzyloxy. |
| 2-hexenal | 2-hexenoxy. |
| p-Cyanobenzaldehyde | p-cyanobenzyloxy. |
| m-(Methylthio)benzaldehyde | m-(methylthio)benzyloxy. |
| o-Methylbenzaldehyde | o-methylbenzyloxy. |

As hereinbefore disclosed, the presence of such substituents as the alkoxy, halogen, carboalkoxy, alkylthio, and alkyl radicals in the aldehyde constituent does not affect the course of the reaction. Thus, when instead of an aliphatic aldehyde there is employed, e.g. an alkoxy substituted aldehyde such as 3-butoxybutyraldehyde, the reaction product with triethyl phosphite and a cyclic silicon halide such as 1-chloro-1-propylthio-2,5-silacyclohexane is [1-(diethoxyphosphinyl)-3-butoxybutoxy]-1-propylthio-2,5-dioxasilacyclohexane; with a substituted benzaldehyde such as 2,4-dichlorobenzaldehyde, triethyl phosphite, and 1-chloro-1-propylthio-2,5-dioxasilacyclohexane the product is [α(diethoxyphosphinyl)-2,4-dichlorobenzyloxy]-1-propylthio-2,5 - dioxasilacyclohexane, etc.

When a ketone, such as acetone, instead of an aldehyde is reacted with the above halogen-containing ring compound of silicon and a trivalent phosphorus ester, such as bis(2-chloropropyl)propylphosphonite, the product is 1-{2-[(2-chloropropoxy)propylphosphinyl]propoxy}-1-propylthio-2,5-dioxasilacyclohexane When cyclohexanone is reacted with the bis(2-chloropropyl)propylphosphonite and 1-chloro-1-propylthio-2,5-dioxasilacyclohexane the product is 1-{1-[(2-chloropropoxy)propylphosphinyl]cyclohexyloxy}-1-propylthio-2,5-dioxasilacyclohexane
which has the structure

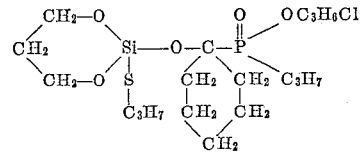

Reaction of a silicon compound having at least one halogen attached to the silicon atom, a carbonyl compound, and a trivalent phosphorus ester compound having at least one alkyloxy or haloalkyloxy group takes place by mixing together the three reactants in the above indicated proportions at ordinary, decreased, or increased temperature and allowing the resulting reaction mixture to stand until formation of the phosphinylhydrocarbyloxysilicon compound is complete. Thus, the silicon halide compound and the trivalent phosphorus ester may be first mixed together and the carbonyl compound added to the resulting mixture, or the carbonyl compound and the trivalent phosphorus ester may be mixed and the silicon halide compound added thereto, or all three reactants can be mixed simultaneously. In a continuous process, one of the three reactants is added to a mixture of the other two reactants while separating the product. Because the reaction may be exothermic, gradual contact of the reactants is usually recommended in order to obtain smooth reaction. However, as well be apparent to those skilled in the art, the exothermal nature of the reaction becomes less of a factor as the molecular weight of the reactants, and particularly of the phosphorus ester, is increased. Also, when the aldehyde is either a higher alkanecarboxaldehyde or an aralkyl or alkaryl aldehyde, reaction is generally not so rapid as it is with lower aliphatic aldehydes or with benzaldehyde. It is thus recommended that with each initial run, the three reactants be mixed gradually at low temperature and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction in any event, can be readily ascertained by noting cessation in change of viscosity, refractive index, or by the quantity of by-product alkyl or haloalkyl halide produced. Using the lower alkanecarboxaldehydes, which aldehydes are generally very reactive, external cooling is usually advantageous. When working with such aldehydes, optimum conditions comprise gradual addition of the aldehyde to the mixture of trivalent phosphorus ester and silicon-halogen compound reactants with application of external cooling and thorough stirring. Usually it suffices to maintain the reaction temperature at, say, from −80 to 50° C. during addition of aldehyde. When all of the aldehyde has been added to said mixture, and there is no longer any evidence of exothermic reaction, completion of the reaction may be assured by heating the reaction mixture to a temperature of from, say, 50° C. to 150° C. With the more sluggish aldehydes, e.g., 2-phenylacetaldehyde or lauraldehyde, it may be necessary to heat the reaction mixture moderately, say, to a temperature of 50° C. before an exothermic reaction is started. Employing naphthaldehyde as the aldehyde reactant and a high molecular weight trivalent phosphorus ester and silicon-halogen compound, even higher temperatures may be required, e.g., temperatures of from 100° C. to 150° C. appear to give the best results.

When it is desired to replace only part of the halogen atoms linked to the silicon atom, it is preferred to mix the proper proportions of reactants at low temperatures, say, at −80 to 0° C. and allow the temperature to rise until the reaction is completed.

The reactants are advantageously employed in stoichiometric proportions, i.e., one mole of carbonylic compound and one mole of the trivalent phosphorus ester per halogen atom to be replaced from the silicon atom. Thus, with a silicon tetrahalide such as silicon tetrachloride there are advantageously used four moles each of the carbonylic compound and the trivalent phosphorus ester compound if complete replacement of halogen is desired. However, if it is desired to replace only three, two, or one of the halogen atoms linked to the silicon atom in the silicon tetrahalide, then only three, two, or one moles, respectively, of each of the carbonylic compound and trivalent phosphorus ester are used per mole of silicon tetrahalide. With a silicon trihalide, e.g., an alkyltrichlorosilane, there are used three moles each of carbonylic compound and trivalent phosphorus ester if complete replacement of halogen in the alkyltrichlorosilane is desired, whereas, if it is desired to replace only, say, one such halogen atom, then only one mole each of carbonylic compound and trivalent phosphorus ester are used. The same principle of proportioning of the reactants applies when working with dihalo- and monohalosilanes. Said stoichiometric proportions are advantageously employed in that thereby good yields of desired product result and there arises substantially no problem of separating any excess reactant or reactants. However, where it is not important to control the number of halogen atoms replaced from the silicon atom, excess amounts of the carbonyl compound, phosphorus ester, or the silicon halide reactants may be employed. In such case, the excess reactants would have to be removed if a pure product were desired.

Formation of the desired product, i.e., a phosphinylhydrocarbyloxysilicon compound, is accompanied by the formation of a halogenated alkane as a by-product. Thus, the reaction of, say, trimethylchlorosilane, acetaldehyde, and triethyl phosphite gives ethyl chloride as a by-product:

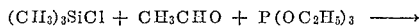
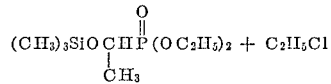

The by-product halogenated alkanes are generally articles of commerce for which many applications exist. Thus, while many currently employed processes for the manufacture of organic compounds of silicon entail substantial waste of halogen in that by-products of little commercial importance are formed, in the present instance all of the halogen constituent of the raw materials is converted to products of economic importance.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, or hexane. When employing no diluent and using substantially the stoichiometric proportion of reactants, the reaction product which consists essentially of the phosphinylhydrocarbyloxysilicon compound dissolved in the halogenated alkane which is produced as a by-product in the reactions, may be used directly for a variety of industrial and agricultural purposes without purification.

An alternative method for the preparation of the present compounds comprises reaction of a silicon halide compound, described above, with an ester of an α-hydroxyphosphonic or -phosphinic acid, or with an α-hydroxyphosphine oxide in the presence of a basic material to remove the hydrogen halide by-product. Thus, reaction of, say, a trialkylchlorosilane with such a phosphorus compound in the presence of pyridine proceeds as follows:

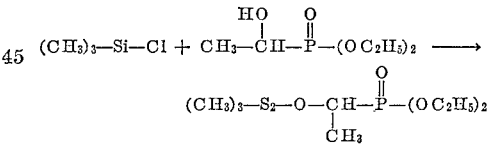

Reaction with a silicon tetrahalide, trihalide, or dihalide results in a similar replacement of four, three, or two halogen atoms, respectively, if stoichiometric amounts of the α-hydroxyphosphorus compound are used. The silicon halide compound may be silicon tetrabromide or tetrachloride, or a compound of the formula $RSiX_3$, $R_2SiX_2$, $R_3SiX$ where X is bromine or chlorine and R is selected from the group consisting of hydrocarbyl, halohydrocarbyl, hydrocarbyloxy, hydrocarbylthio, halohydrocarbyloxy, and halohydrocarbylthio radicals having from 1 to 12 carbon atoms. The α-hydroxyphosphorus reactant may be any compound of the general formula

wherein Y is selected from the group consisting of hydrogen, and hydrocarbyl radicals of from 1 to 12 carbon atoms when n is zero to one, and when n is 2 to 3, Y is selected from the group consisting of hydrogen and hydrocarbyl radicals of from 1 to 17 carbon atoms, furyl and thienyl radicals, and said radicals carrying a substituent selected from the group consisting of halogen, cyano, —alkyl, —Oalkyl, —Salkyl, and —COOalkyl where alkyl has from 1 to 5 carbon atoms; Z is selected from the class consisting of hydrogen and the methyl radical and is methyl radical only when Y is an alkyl radical of from 1 to 2 carbon atoms, and Y and Z taken together complete a cycloalkane ring having 5 to 6 carbon atoms in the ring and a total of from 5 to 10 carbon atoms; and each A is selected from the group consisting of hydrocarbyl, hydrocarbyloxy, halohydrocarbyl, and halohydrocarbyloxy radicals which contain from 1 to 12 carbon atoms.

The compounds of this invention which have halogen atoms attached to the silicon atom can be reacted with various chemicals to replace or relocate the halogen atoms so attached. Thus, such compounds may be reacted with alcohols, or thiols, to replace the halogen atoms with hydrocarbyloxy, or hydrocarbylthio radicals. Particularly useful chemicals for reaction with the halogen compounds are epoxides having from one to 12 carbon atoms. Epoxides react with the bromine or chlorine atoms attached to the silicon atoms to form halohydrocarbyloxy radicals attached to the silicon atom. For example, [1-(dipropoxyphosphinyl)ethoxy]dimethylchlorosilane reacts with, say, 1,2-epoxybutane according to the following scheme,

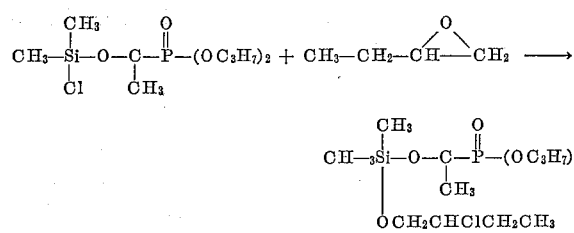

to give [1-(dipropoxyphosphinyl)ethoxy]-2-chlorobutoxydimethylsilane. Examples of epoxides that can be used are: ethylene oxide, propylene oxide, 2,3-epoxyhexane, 3,4-epoxyhexane, 1,2-epoxy-2-methylpropane, 2,3-epoxybutane, 3,4-epoxy-4-methyl-1-pentene, 2,3-epoxypentane, (1,2 - epoxypropyl)benzene, 1,2 - epoxyethylnaphthalene, 4,5-epoxydecane. The epoxides used can also contain substituent groups therein such as alkoxy, carboalkoxy, aryloxy, alkylmercapto, arylmercapto, cyano, halogen, etc.

The compounds generally provided by this invention are stable, usually high boiling materials which range from viscous liquids to waxy or crystalline solids. They are used as biological toxicants, e.g., as insecticides, fungicides, nematocides, bacteriostats; as lubricant and gasoline additives; as functional fluids, e.g., in force-transmission media and dielectric applications; as plasticizers for synthetic resins and plastics; as rubber-compounding chemicals; as flame-proofing agents for cellulosic and carbonaceous combustible materials, e.g. surface coatings, lacquers, polymers, resins, adhesives and sealing compounds; as antioxidants; as dielectrics; and as pharmaceuticals.

Those of the presently provided phosphinylhydrocarbyloxy compounds which are gasoline-soluble are particularly useful as preignition additives for leaded gasolines. The invention thus provides an improved fuel for spark ignition internal combustion engines which consists essentially of gasoline, an organo lead anti-knock, and a gasoline soluble phosphinylsilicon ester, said ester being present in said fuel in a quantity sufficient to suppress preignition of the fuel and spark plug fouling.

Preignition is the ignition of the combustible mixture of air and fuel prior to firing by the spark plug. This occurs when deposits of readily glowing material build up in the combustion chamber. When the fuel is a gasoline containing an organolead anti-knock together with a halohydrocarbon scavenger, such readily glowing deposits comprise carbon in a mixture with lead halides, the latter acting to reduce the normal ignition temperature of carbon. Since reduction of the ignition temperature tends to increase with increasing concentration of the organolead anti-knock, preignition is a problem which becomes particularly troublesome as use of high compression engines becomes more prevalent. The deposits of carbon and lead salt retain sufficient heat from the previous firing cycle in sufficient quantity to permit them to glow, and if the glowing period (which depends on ease of ignition, and hence the lead content of the deposit) is long enough, the fuel is fired in the next cycle before it can be fired by the spark plug. The erratic firing which thus results is demonstrated by a "wild ping" or a dull, thudding knock. It is generally accompanied by increased detonation, spark-plug fouling, and reduction of exhaust valve life.

It has now been found that preignition and various difficulties consequent thereto can be substantially suppressed or entirely eliminated by incorporating into the leaded gasoline a phosphinyl silicon compound which is soluble in said gasoline in a preignition inhibiting quantity. Such a quantity, of course, will depend upon the content of organolead compound and halo-hydrocarbon scavenger in the fuel. Leaded gasolines usually contain an anti-knocking quantity of an organolead compound such as tetraethyllead, tetramethyllead, dimethyldiethyllead, or tetraphenyllead and substantially the amount of hydrocarbon halide scavenger, say, ethylene dibromide, ethylene dichloride, acetylene tetrabromide, or mono- or polyhalopropane, butane, or pentane, or polyhaloalkyl benzene, which is calculated to react with the organolead compound to give a lead halide, e.g., lead bromide when the organolead compound is tetraethyllead and the halohydrocarbon is ethylene dibromide. The quantity of the present phosphinyl-silicon compound which will suppress preignition of the leaded hydrocarbon fuel will depend upon the quantity of lead present in the fuel and will vary from, say, 0.05 to 10.0 moles of said ester per mole of lead present in said fuel.

*Example 1*

Acetaldehyde (55 g. or 1.25 moles) was added to a mixture consisting of 108.6 g. (1.0 mole) of trimethylchlorosilane and 166 g. (1.0 mole) of triethyl phosphite during 0.2 hour with cooling at 35°–40° C. The reaction mixture was cooled at 35°–46° C. for 0.5 hour more and then warmed to 80° C. Distillation gave 246.8 g. (97% of theory) of a colorless liquid, B.P. 66°–74° C./0.2–0.3 mm. Rectification in a packed column gave 230.6 g., B.P. 55°–56° C./0.1–0.2 mm., $n_D^{25}$ 1.4204, which was [1-(diethoxyphosphinyl)ethoxy]trimethylsilane,

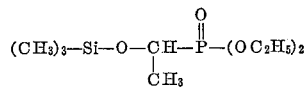

| | Found | Anal. Calcd. for $C_9H_{23}O_4PSi$ |
|---|---|---|
| C | 42.48 | 42.5 |
| H | 9.12 | 9.1 |
| P | 12.09 | 12.2 |
| Si | 11.20 | 11.05 |

*Example 2*

This example illustrates an alternative method for making the same product as was produced in the preceding example.

Diethyl 1-hydroxyethylphosphonate (0.25 mole) and 23.7 g. (0.30 mole) of pyridine were placed in a 500 ml. flask with 200 ml. of benzene. This mixture was stirred and cooled in ice as 29.3 g. (0.27 mole) of trimethylchlorosilane was added during 0.2 hour at 22° to 25° C. The reaction mixture was warmed at 70°–75° C. for 0.3 hour, cooled to 20° C. and filtered. The filtrate was distilled and then rectified to give 51.7 g. of colorless liquid, B.P. 55°–56° C./0.1–0.2 mm., $n_D^{25}$ 1.4204, and analyzing as follows:

|   | Found | Anal. Calcd. for $C_9H_{23}O_4PSi$ |
|---|---|---|
| C | 42.65 | 42.5 |
| H | 9.15 | 9.1 |
| P | 12.03 | 12.2 |
| Si | 11.18 | 11.05 |

It was shown by infrared spectra to be identical to the product of the preceding experiment.

*Example 3*

To a mixture consisting of 64.5 g. (0.5 mole) of dimethyldichlorosilane and 166 g. (1.0 mole) of triethyl phosphite in a 500 ml. flask there was added 47 g. (1.07 moles) of freshly distilled acetaldehyde over 0.3 hour with cooling at 15° to 22° C. The mixture was warmed to 100° C. and then distilled to give 165 g. (79% of theory) of colorless liquid, B.P. 148°–154° C./0.2–0.4 mm., $n_D^{25}$ 1.4355, which was bis[1-(diethoxyphosphinyl)ethoxy]dimethylsilane,

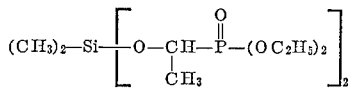

| Percent | Found | Anal. Calcd. for $C_{14}H_{34}O_8P_2Si$ |
|---|---|---|
| C | 40.02 | 40.0 |
| H | 8.10 | 8.17 |
| P | 14.74 | 14.8 |
| Si | 6.94 | 6.7 |

*Example 4*

To a mixture consisting of 50 g. (0.282 mole) of dichloromethyldimethylchlorosilane and 49 g. (0.295 mole) of triethyl phosphite 22.2 g. (0.382 mole) of propionaldehyde was added dropwise while cooling and stirring the reaction mixture to keep the temperature below 20° C. After addition was complete, the mixture was warmed at 60° to 100° C. for 2 hours and then concentrated at reduced pressure to give 93.2 g. of product. Distillation of a portion of this product gave a colorless liquid, B.P. 114–118° C./0.15–0.20 mm., which was [1-(diethoxyphosphinyl)propoxy]dichloromethyldimethylsilane,

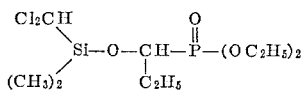

|   | Found | Anal. Calcd. for $C_{10}H_{23}Cl_2O_4PSi$ |
|---|---|---|
| C | 35.59 | 35.60 |
| H | 7.18 | 6.87 |
| P | 9.31 | 9.19 |
| Si | 8.25 | 8.32 |

*Example 5*

To a mixture consisting of 34.2 g. (0.220 mole) of allylmethyldichlorosilane and 75.6 g. (0.455 mole) of triethyl phosphite, there was added 31.4 g. (0.540 mole) of propionaldehyde while the temperature of the reaction mixture was controlled between 15°–20° C. The reaction mixture was then heated at 60° C. for 1 hour and concentrated to 100° C. at reduced pressure to give 104.7 g. of bis[1-(diethoxyphosphinyl)propoxy]allylmethylsilane, B.P. 168°–175° C./0.30–0.40 mm., having the structure

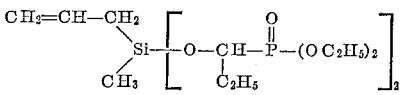

|   | Found | Anal. Calcd. for $C_{18}H_{40}O_8P_2Si$ |
|---|---|---|
| C | 45.49 | 45.60 |
| H | 8.24 | 8.48 |
| P | 12.86 | 13.02 |
| Si | 6.04 | 5.90 |

*Example 6*

To a mixture consisting of 20 g. (0.125 mole) of chloromethylmethyldichlorosilane and 43.4 g. (0.261 mole) of triethyl phosphite 20.1 g. (0.346 mole) of propionaldehyde was added dropwise while maintaining the temperature at 15° and 20° C. After the reaction was complete, the mixture was heated first to 60° C. for 1 hour and then to 100° C. and placed under vacuum for 1.25 hours as the temperature was gradually raised to 130° C. to remove low-boiling materials. The residue remaining in the flask was bis[1-(diethoxyphosphinyl)propoxy]chloromethylmethylsilane,

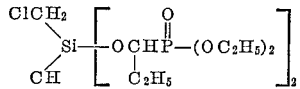

|   | Found | Anal. Calcd. for $C_{16}H_{37}ClO_8P_2Si$ |
|---|---|---|
| C | 40.05 | 39.75 |
| H | 7.86 | 7.85 |
| P | 12.91 | 12.80 |
| Si | 5.61 | 5.80 |

*Example 7*

To a mixture consisting of 69.3 g. (0.500 mole) of dimethylethoxychlorosilane and 85.5 g. (0.515 mole) of triethyl phosphite 34.8 g. (0.600 mole) of propionaldehyde was added dropwise while keeping the temperature below 25° C. with occasional cooling. After the addition of aldehyde was completed the reaction mixture was stirred at room temperature for 0.25 hour and then heated in successive steps at 60° to 100° C. for 1.5 hours and then concentrated at reduced pressure to give 143 g. of product. Distillation of a portion gave a colorless liquid, B.P. 92–93° C./0.4 mm., which was [1-(diethoxyphosphinyl)propoxy]ethoxydimethylsilane,

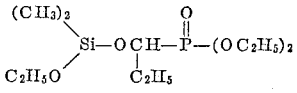

|   | Found | Anal. Calcd. for $C_{11}H_{27}O_5PSi$ |
|---|---|---|
| C | 44.37 | 44.25 |
| H | 9.05 | 9.14 |
| P | 10.38 | 10.38 |
| Si | 9.45 | 9.40 |

*Example 8*

Freshly distilled furfural, 31.7 g. (0.33 mole), was added dropwise to a cooled mixture of 38 g. (0.35 mole) of trimethylchlorosilane and 61.5 g. (0.37 mole) of triethyl phosphite while keeping the temperature below 20° C. with an ice bath. The reaction mixture was warmed to 60°–70° C. under vacuum to remove low-boiling by-products and excess reactants. The residue consisted of substantially pure [α-(diethoxyphosphinyl)furfuryloxy]-trimethylsilane,

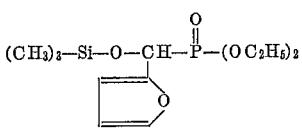

| | Found | Anal. Calcd. for $C_{12}H_{25}O_5PSi$ |
|---|---|---|
| C | 47.62 | 47.60 |
| H | 6.42 | 6.64 |
| P | 10.15 | 10.22 |
| Si | 9.07 | 9.25 |

*Example 9*

Propionaldehyde (25.2 g. or 0.433 mole) was added to 114.4 g. of an equimolar mixture of diethoxymethylchlorosilane and triethyl phosphite while controlling the temperature below 20° C. by cooling. After the exothermic reaction was completed, the mixture was heated at 60° C. under aspirator vacuum for 1 hour to remove low-boiling fractions. The residue remaining in the reaction flask was distilled to obtain [1-(diethoxyphosphinyl)propoxy)diethoxymethylsilane, B.P. 102–104° C./0.33–0.40 mm., having the structure

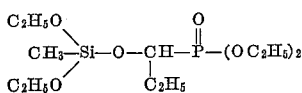

| | Found | Anal. Calcd. for $C_{12}H_{29}O_6PSi$ |
|---|---|---|
| C | 43.79 | 43.90 |
| H | 8.81 | 8.90 |
| P | 9.52 | 9.43 |
| Si | 8.73 | 8.54 |

*Example 10* p-Tolualdehyde (39.7 g. or 0.33 mole) was added to a mixture consisting of 38 g. (0.35 mole) of trimethylchlorosilane and 46 g. (0.35 mole) of trimethyl phosphite while stirring and cooling at 15°–23° C. The reaction mixture was then heated at 65° to 105° C. for 1.25 hours and concentrated at reduced pressure. Distillation of an 84.6 g. portion of the residue gave 78.6 g. of [α-(dimethoxyphosphinyl)-4-methylbenzyloxy]trimethylsilane, B.P. 126° C./0.44 mm., having the structure

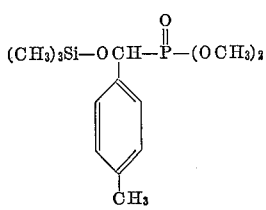

| | Found | Anal. Calcd. for $C_{13}H_{23}O_4PSi$ |
|---|---|---|
| C | 51.85 | 51.70 |
| H | 7.58 | 7.66 |
| P | 10.01 | 10.23 |
| Si | 9.56 | 9.27 |

*Example 11* o-Chlorobenzaldehyde (46.4 g. or 0.33 mole) was added dropwise to a cooled (18° C.) mixture consisting of 38 g. (0.35 mole) of trimethylchlorosilane and 61.5 g. (0.37 mole) of triethyl phosphite. After the reaction was completed, the mixture was heated at 60°–65° C. for 1 hour and then concentrated at 100° C. under aspirator vacuum for 0.75 hour to give 117.7 g. of crude product. A portion of the crude product was distilled to give pure [α-(diethoxyphosphinyl)-2-chlorobenzyloxy]trimethylsilane, B.P. 132–134° C./0.6 mm., having the structure

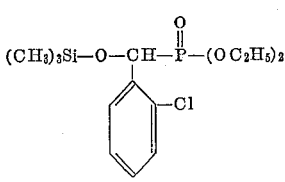

| | Found | Anal. Calcd. for $C_{14}H_{24}ClO_4PSi$ |
|---|---|---|
| C | 48.09 | 48.00 |
| H | 7.11 | 6.89 |
| Cl | 10.28 | 10.11 |
| P | 8.57 | 8.83 |
| Si | 8.52 | 8.27 |

*Example 12*

Propionaldehyde (14.8 g. or 0.254 mole) was added dropwise to a mixture consisting of 30 g. (0.154 mole) of 1-chloro-1,3,3,5-tetramethyl-2,6-dioxasilacyclohexane and 29.1 g. (0.175 mole) of triethyl phosphite with intermittent cooling. After the reaction was complete, the mixture was heated to 60° C. in 1 hour and then to 100° C. under aspirator vacuum to remove low boilers. A portion of the residue was distilled to yield 1-[1-(diethoxyphosphinyl)propoxy]-1,3,3,5-tetramethyl-2,6-dioxasilacyclohexane, B.P. 115–116° C./0.6 mm., having the formula

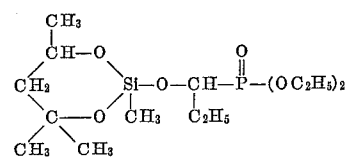

| | Found | Anal. Calcd. for $C_{14}H_{31}O_6PSi$ |
|---|---|---|
| C | 47.37 | 47.40 |
| H | 9.00 | 8.83 |
| P | 9.00 | 8.74 |
| Si | 7.52 | 7.92 |

*Example 13*

To a mixture consisting of 25.3 g. (0.233 mole) of trimethylchlorosilane and 41.6 g. (0.250 mole) of triethyl phosphite 29 g. (0.231 mole) of 2,2-dimethyl-4-cyanobutyraldehyde was added at room temperature. There was a slight (5° C.) rise in reaction temperature. After the reaction was completed the mixture was heated to 60° C. in 1.25 hours and then to 80° C. in 1.5 hours under aspirator vacuum to give 52.5 g. of crude product. This product was distilled to obtain a colorless liquid, B.P. 143°–145° C./0.7 mm., which was [1-(diethoxyphosphinyl)-2,2-dimethyl-4-cyanobutoxy]trimethylsilane,

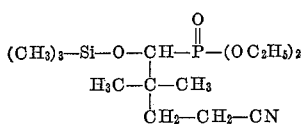

| | Found | Anal. Calcd. for $C_{14}H_{30}NO_4PSi$ |
|---|---|---|
| C | 49.94 | 50.20 |
| H | 9.10 | 9.02 |
| N | 4.35 | 4.18 |
| P | 9.24 | 9.24 |
| Si | 8.34 | 8.36 |

*Example 14* p-Anisaldehyde (39.5 g. or 0.29 mole) was added dropwise to a mixture consisting of 32.6 g. (0.30 mole) of trimethylchlorosilane and 51.5 g. (0.31 mole) of triethyl phosphite with cooling at 20° to 25° C. The solution so obtained was heated to 60° C. in 1 hour and then concentrated to 100° C. under aspirator vacuum to remove low boilers. The residue was distilled to obtain a colorless liquid, B.P. 144° to 145° C./0.6 mm., which was [α-(diethoxyphosphinyl) - 4 - methoxybenzyloxy]trimethylsilane,

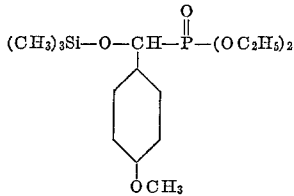

|   | Found | Anal. Calcd. for $C_{15}H_{27}O_5PSi$ |
|---|---|---|
| C | 52.11 | 52.00 |
| H | 8.06 | 7.86 |
| P | 8.91 | 8.94 |
| Si | 8.19 | 8.09 |

*Example 15*

3-carbethoxypropionaldehyde (46.4 g. or 0.357 mole) was added dropwise to a mixture consisting of 36.1 g. (0.332 mole) of trimethylchlorosilane and 59.4 g. (0.357 mole) of triethyl phosphite while cooling the mixture below 20° C. The resulting water-white solution was heated to 60° C. in 0.75 hour and then concentrated under aspirator vacuum to 100° C. to remove low boiling fractions. The residue was distilled to obtain a colorless liquid, B.P. 125°–126° C./0.45 mm., which was [1-(diethoxyphosphinyl) - 3 - carbethoxypropoxy]trimethylsilane,

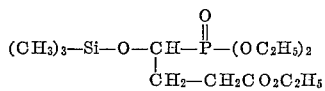

|   | Found | Anal. Calcd. for $C_{13}H_{29}O_6PSi$ |
|---|---|---|
| C | 45.86 | 45.90 |
| H | 8.76 | 8.58 |
| P | 9.23 | 9.10 |
| Si | 8.39 | 8.23 |

*Example 16*

To a cooled (10° C.) mixture of 34.8 g. (0.32 mole) of trimethylchlorosilane and 53.3 g. (0.32 mole) of triethyl phosphite 37.3 g. (0.30 mole) of 6-methyl-3-cyclohexenecarboxaldehyde was added dropwise while cooling the mixture below 20° C. The resulting solution was heated at 60°–80° C. for 2.75 hours and then concentrated under aspirator vacuum to 100° C. to give 51.3 g. of crude product as residue. The residue was distilled to obtain a colorless liquid, B.P. 124°–125° C./0.6 mm., which was [6-methyl - 3 - cyclohexenyl-1-(diethoxyphosphinyl)methoxy]trimethylsilane,

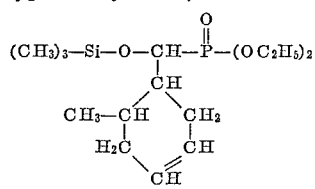

|   | Found | Anal. Calcd. for $C_{15}H_{33}O_4PSi$ |
|---|---|---|
| C | 53.81 | 53.60 |
| H | 9.49 | 9.89 |
| P | 9.02 | 9.20 |
| Si | 8.39 | 8.33 |

*Example 17*

To a mixture of 46.5 g. (0.335 mole) of dimethylethoxychlorosilane and 55 g. (0.330 mole) of triethyl phosphite 18.9 g. (0.325 mole) of acetone was added at room temperature and refluxed at 68° C. overnight. After removing low boiling materials by aspirator vacuum the crude residue was distilled to obtain a colorless liquid, B.P. 80° C./0.4 mm., which was [2-(diethoxyphosphinyl)propoxy]dimethylethoxysilane,

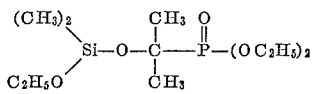

*Example 18*

Phenylacetaldehyde (36.3 g. or 0.302 mole) was added dropwise to a mixture consisting of 35.0 g. (0.322 mole) of trimethylchlorosilane and 53.5 g. (0.322 mole) of triethyl phosphite while cooling the mixture below 20° C. The mixture was stirred at room temperature a short time and then heated to 65° C. under aspirator vacuum to remove the low-boiling materials. Distillation of a portion of the residue gave a colorless liquid, B.P. 129°–130° C./0.4–0.5 mm., which was [1-(diethoxyphosphinyl)-2-phenylethoxy]trimethylsilane

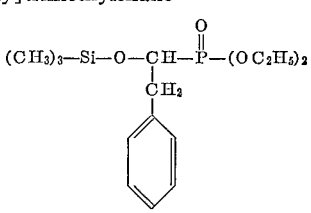

|   | Found | Anal. Calcd. for $C_{15}H_{27}O_4PSi$ |
|---|---|---|
| C | 54.58 | 54.50 |
| H | 8.58 | 8.24 |
| P | 9.45 | 9.37 |
| Si | 8.65 | 8.48 |

*Example 19*

Undecanal (35.8 g. or 0.210 mole) was added at a dropwise rate to a cooled (15° C.) mixture consisting of 36 g. (0.185 mole) of 1-chloro-1,3,3,5-tetramethyl-2,6-dioxasilacyclohexane and 35 g. (0.210 mole) of triethyl phosphite. The mixture was then heated to 60° C. and stirred for 2.15 hours to insure complete reaction. After removing low boiling volatiles, a portion of the residue was distilled to obtain a colorless liquid, B.P. 178°–179° C./0.35–0.40 mm., which was 1-[1-(diethoxyphosphinyl)undecyloxy] - 1,3,3,5 - tetramethyl-2,6-dioxasilacyclohexane,

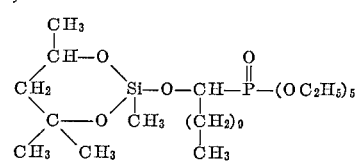

|   | Found | Anal. Calcd. for $C_{22}H_{47}O_6PSi$ |
|---|---|---|
| C | 56.49 | 56.70 |
| H | 10.15 | 10.15 |
| P | 6.58 | 6.65 |
| Si | 6.31 | 6.02 |

*Example 20*

To a mixture of 174.6 g. (1.05 moles) of triethyl phosphite and 64 g. (1.10 moles) of propionaldehyde 42.5 g. (0.25 mole) of silicon tetrachloride was added dropwise while cooling the mixture in a Dry Ice-acetone bath. After the addition of aldehyde was completed, the temperature was allowed to rise slowly with stirring. The resulting water-white, viscous liquid was heated to 65° C. under aspirator vacuum and then at 135°–150° C./0.25–0.30 mm. under oil pump vacuum for 1.5 hours to remove low boiling by-product and excess reactants. The liquid was stable at the higher temperatures and did not distill. It was substantially pure tetra[1-(diethoxyphosphinyl) propyl] silicate.

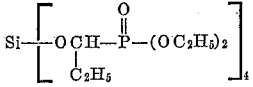

| | Found | Anal. Calcd. for $C_{28}H_{64}O_{16}P_4Si$ |
|---|---|---|
| C | 41.84 | 41.70 |
| H | 8.19 | 7.98 |
| P | 15.13 | 15.31 |
| Si | 3.41 | 3.46 |

*Example 21*

A mixture consisting of 41.7 g. (0.30 mole) of dimethylethoxychlorosilane, 46 g. (0.45 mole) of cyclohexanone, and 50 g. (0.30 mole) of triethyl phosphite was heated at 86° to 110° until reaction was complete. Aspirator vacuum was then used to remove low boilers. The residue remaining in the flask was distilled to give a colorless liquid, B.P. 125° C./0.33 mm., which was [1 - (diethoxyphosphinyl)cyclohexyloxy]dimethylethoxysilane.

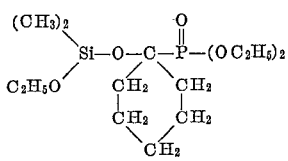

| | Found | Anal. Calcd. for $C_{14}H_{31}O_5PSi$ |
|---|---|---|
| C | 49.35 | 49.70 |
| H | 9.08 | 9.22 |

*Example 22*

Propionaldehyde (16.5 g. or 0.284 mole) was added at a slow dropwise rate (about 1 drop/sec.) into a mixture consisting of 20.3 g. (0.092 mole) of bis(ethylthio) dichlorosilane and 34.1 g. (0.205 mole) of triethyl phosphite while cooling below 20° C. The mixture was stirred at room temperature for 1 hour and then heated to 60° C. under aspirator vacuum for 1 hour and finally to 135° C. under oil pump vacuum to remove low boiling materials. The residue was substantially pure bis[1-(diethoxyphosphinyl)propoxy]bis(ethylthio)silane,

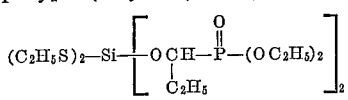

| | Found | Anal. Calcd. for $C_{18}H_{42}O_8P_2S_2Si$ |
|---|---|---|
| C | 40.23 | 40.01 |
| H | 7.88 | 7.81 |
| P | 11.65 | 11.44 |
| S | 11.96 | 11.83 |
| Si | 5.35 | 5.19 |

*Example 23*

To a mixture consisting of 30 g. (0.122 mole) of tris-(ethylthio)chlorosilane and 23.1 g. (0.145 mole) of triethyl phosphite 12.9 g. (0.222 mole) of propionaldehyde was added dropwise while cooling below 20° C. The reaction mixture was heated to 60° C. in 1 hour and then placed under vacuum and heated to 145° C. to remove low boiling materials. The residue was distilled to obtain a colorless liquid, B.P. 172°–173° C./0.6–0.7 mm., which was [1-diethoxyphosphinyl)propoxy]tris(ethylthio)silane,

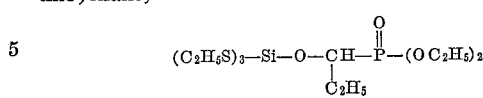

| | Found | Anal. Calcd. for $C_{13}H_{31}O_4PS_3Si$ |
|---|---|---|
| C | 38.20 | 38.40 |
| H | 7.59 | 7.69 |
| P | 7.49 | 7.62 |
| S | 23.51 | 23.63 |
| Si | 6.64 | 6.88 |

*Example 24*

Silicon tetrachloride was added dropwise to a cooled (−25° to −30° C.) mixture of 75 g. (0.45 mole) triethyl phosphite and 47.7 g. (0.45 mole) of freshly distilled benzaldehyde until a total of 17 g. (0.1 mole) had been added, care being taken to keep the temperature of the mixture around −25° C. during the exothermic reaction. The mixture was heated to 75° C. and placed first under aspirator vacuum for 1 hour and then under oil pump vacuum (0.25 mm.) for 1.5 hours at 140° to 150° C. to remove low boiling fractions. The viscous product was substantially pure tetra[α-(diethoxyphosphinyl)benzyl] silicate,

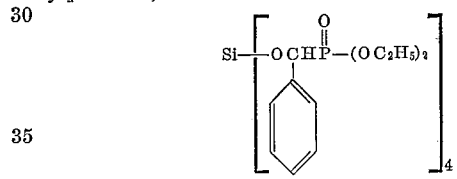

| | Found | Anal. Calcd. for $C_{44}H_{64}O_{16}P_4Si$ |
|---|---|---|
| C | 52.06 | 52.84 |
| H | 6.48 | 6.45 |
| P | 12.12 | 12.39 |
| Si | 3.22 | 2.81 |

*Example 25*

To a mixture consisting of 24.8 g. (0.053 mole) of trioctylbromosilane and 22.1 g. (0.066 mole) of trihexyl phosphite 9.1 g. (0.156 mole) of propionaldehyde was added in 2 portions while cooling the mixture in tap water to control the slightly exothermic reaction. The reaction mixture was then heated to 60° C. in 3 hours and at 100° C. for 1.5 hours and then placed under oil pump vacuum to remove the lower boiling by-product. The remaining liquid was substantially pure [1-(dihexyloxyphosphinyl) propoxy]trioctylsilane

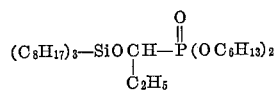

| | Found | Anal. Calcd. for $C_{39}H_{83}O_4PSi$ |
|---|---|---|
| C | 69.05 | 69.30 |
| H | 12.31 | 12.40 |
| P | 4.68 | 4.59 |
| Si | 4.05 | 4.15 |

*Example 26*

Methyl diphenylphosphinite, 7.3 g. (0.0337 mole), was dissolved in about 10 ml. of propionaldehyde. The resulting solution was cooled to 10° C. and treated with 4.7 g. of trimethylchlorosilane with cooling. The reaction mixture was warmed to 70° C. and the volatile material removed at reduced pressure to give crystalline [1-(diphenylphosphinyl)propoxy]trimethylsilane,

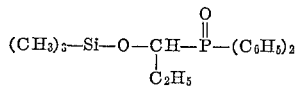

Example 27

To 66 g. of diethyl phenylphosphonite was added sufficient propionaldehyde (25.3 g.) to effect dissolution while cooling the mixture to 4° C. Trimethylchlorosilane was then added dropwise while maintaining the temperature between 5° and 15° C. The mixture was heated to 60° C. with stirring and then placed under aspirator vacuum for 10–15 minutes to remove by-product. Distillation of a portion of the residue gave a colorless liquid, B.P. 127°–128° C./0.4 mm., which was [1-(ethoxyphenylphosphinyl)propoxy]trimethylsilane,

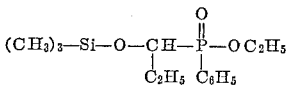

|    | Found | Anal. Calcd. for $C_{14}H_{25}O_3PSi$ |
|----|-------|---------------------------------------|
| C  | 56.29 | 56.10 |
| H  | 8.34  | 8.39  |
| P  | 10.55 | 10.30 |
| Si | 9.45  | 9.34  |

Example 28

To a cooled (−25° C.) mixture consisting of 106 g. (0.625 mole) of silicon tetrachloride and 425 g. (2.55 moles) of triethyl phosphite, 143 g. (2.55 moles) of acrolein was added dropwise while controlling the temperature of the reaction mixture below −25° C. with a Dry Ice-acetone bath. The solution was heated to 75° C. in 1.5 hours and then placed under vacuum while the temperature was gradually increased to 155° C/0.25 mm. The residue was tetra[1-(diethoxyphosphinyl)-2-propenyl] silicate,

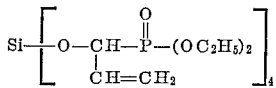

|    | Found | Anal. Calcd. for $C_{28}H_{56}O_{16}P_4Si$ |
|----|-------|---------------------------------------------|
| C  | 41.90 | 42.10 |
| H  | 6.95  | 6.93  |
| P  | 14.96 | 15.36 |
| Si | 3.76  | 3.50  |

Example 29

To a mixture consisting of 148.2 g. of tris(2-chloroethyl) phosphite and 32.2 g. of dimethyldichlorosilane was added 53.0 g. of freshly distilled benzaldehyde during 0.2 hour while controlling the temperature of the reaction mixture at 16°–19° C. by cooling. The mixture was warmed to 110° C. and then concentrated to a pot temperature of 180° C./0.1 mm. to give 172.6 g. of bis{α-[bis(2-chloroethoxy)phosphinyl]benzyloxy}dimethylsilane,

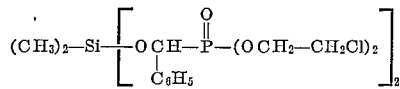

Example 30

To a mixture consisting of 66.5 g. (0.306 mole) of cyclohexyltrichlorosilane and 152 g. (0.918 mole) of triethyl phosphite there was added 41.6 g. (0.935 mole) of acetaldehyde in portions while controlling the temperature below 20° C. by cooling. The reaction mixture was then warmed at 100° C. under aspirator vacuum for one hour to remove by-product ethyl chloride and excess acetaldehyde. The colorless, viscous residue analyzed as follows:

|    | Found | Calcd. for $C_{24}H_{53}O_{12}P_3Si$ |
|----|-------|---------------------------------------|
| C  | 44.08 | 44.10 |
| H  | 8.69  | 8.17  |
| P  | 13.52 | 14.20 |
| Si | 4.78  | 4.28  |

The product, tris[1-(diethoxyphosphinyl)ethoxy]cyclohexylsilane, has the structural formula

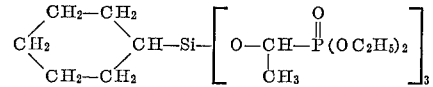

Example 31

To a mixture consisting of 96.5 g. (0.58 mole) of triethyl phosphite and 115 g. (0.58 mole) of triethoxychlorosilane was added 83.3 g. (0.65 mole) of 2-ethylhexaldehyde as the temperature of the mixture was gradually raised from 60° to 155° C. to remove by-product ethyl chloride and excess 2-ethylhexaldehyde. The crude residue was substantially 1-(diethoxyphosphinyl)-2-ethylhexyloxytriethoxysilane,

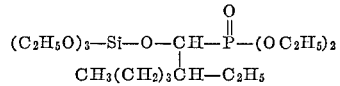

Example 32

To a mixture consisting of 56.2 g. (0.338 mole) of triethyl phosphite and 66 g. (0.338 mole) triethylbromosilane was added 15.4 g. (0.350 mole) of acetaldehyde in portions while keeping the temperature of the mixture below 35° C. with an ice bath. After addition of the acetaldehyde was completed, the mixture was stirred for two hours at room temperature and then slowly heated to 100° C. under aspirator vacuum until the ethyl bromide by-product was removed. The colorless residue distilled to give 70 g. of [1-(diethoxyphosphinyl)ethoxy] triethylsilane,

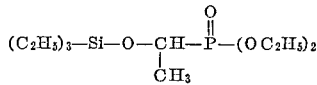

having a boiling point, of 101–103° C./0.20–0.25 mm. and analyzing as follows:

|    | Found | Calcd. for $C_{12}H_{29}O_4PSi$ |
|----|-------|----------------------------------|
| C  | 48.66 | 48.60 |
| H  | 10.24 | 9.86  |
| P  | 10.34 | 10.42 |
| Si | 9.54  | 9.46  |

Example 33

To a mixture consisting of 43.3 g. (0.261 mole) of triethyl phosphite and 25 g. (0.131 mole) of methylphenyldichlorosilane was added 15.6 g. (0.270 mole) of propionaldehyde in small portions while controlling the reaction temperature within the range of 30° to 35° C. by cooling when necessary. After addition of propionaldehyde was completed, the mixture was stirred for one hour at room temperature. Then the reaction mixture was slowly heated to 100° C. under aspirator vacuum to remove 11.5 g. of by-product ethyl chloride and excess reactants. Concentration to a pot temperature of 190°

C./0.4 mm. gave as a residue bis[1-(diethoxyphosphinyl)propoxy]methylphenylsilane,

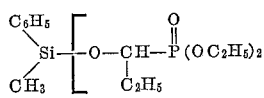

|   | Found | Anal. Calcd. for $C_{21}H_{40}O_8P_2Si$ |
|---|---|---|
| C | 49.56 | 49.50 |
| H | 8.28 | 7.90 |
| P | 12.12 | 12.12 |
| Si | 5.54 | 5.48 |

*Example 34*

To a mixture consisting of 25 g. (0.085 mole) of triphenyl chlorosilane and 14.1 g. (0.085 mole) of triethyl phosphite was added 5.5 g. (0.095 mole) of propionaldehyde while controlling the temperature at 60 to 65° C. The mixture was stirred at this temperature for three hours to insure complete reaction. Thereafter the reaction mixture was slowly heated to 100° C. and maintained at that temperature for 2.5 hours to remove by-product and excess aldehyde. Concentration of the remaining liquid to 150° C. yielded a viscous product which was [1-(diethoxyphosphinyl)propoxy]triphenylsilane.

*Example 35*

A mixture of 57.5 g. (0.29 mole) of triethoxychlorosilane, 58.2 g. (0.35 mole) of freshly distilled triethyl phosphite, and 28.8 g. (0.40 mole) of freshly distilled butyraldehyde was heated at 80 to 100° C. for several hours. Distillation gave a major fraction, B.P. 114.5–117° C./0.23–0.25 mm., which was [1-(diethoxyphosphinyl)butoxy]triethoxy silane,

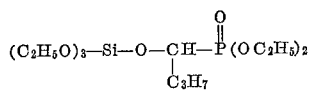

|   | Found | Anal. Calcd. for $C_{14}H_{33}O_7PSi$ |
|---|---|---|
| C | 44.87 | 45.20 |
| H | 8.94 | 8.93 |
| P | 8.94 | 8.31 |
| Si | 5.83 | 5.63 |

*Example 36*

To a mixture of 50 g. (0.145 mole) of bis(trichlorosilyl)benzene and 155 g. (0.93 mole) of triethyl phosphite 59.2 g. (1.02 mole) of propionaldehyde was added in small portions while keeping the temperature of the mixture below 25° C. until addition was complete. The solution was stirred for two hours at 60° C to ensure complete reaction, and then the temperature was gradually raised to 130° C. while aspirating to remove low boiling volatiles. The residue was substantially pure X,X-bis-{tris[1-(diethoxyphosphinyl)propoxy]silyl}benzene. X,X stands for the 1,2;1,3;1,4 positions on the benzene ring.

|   | Found | Anal. Calcd. for $C_{48}H_{100}O_{24}P_6Si_2$ |
|---|---|---|
| C | 44.50 | 44.30 |
| H | 7.89 | 7.74 |
| P | 13.90 | 14.23 |
| Si | 4.23 | 4.31 |

*Example 37*

To a mixture consisting of 47.5 g. (0.16 mole) of 1,2-bis(trichlorosilyl)ethane and 166.2 (1.0 mole) of triethyl phosphite 64 g. of propionaldehyde was added dropwise while keeping the temperature of the reaction mixture below 25° C. by cooling. After addition of the propionaldehyde was complete, the mixture was heated at 60° C. for two hours and then concentrated to 130° C. at reduced pressure to give substantially pure 1,2-bis{tris-[1-(diethoxyphosphinyl)propoxy]silyl}ethane.

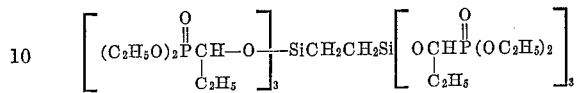

|   | Found | Anal. Calcd. for $C_{44}H_{100}O_{24}P_6Si_2$ |
|---|---|---|
| C | 42.34 | 42.23 |
| H | 8.13 | 8.04 |
| P | 14.73 | 14.80 |
| Si | 4.57 | 4.47 |

*Example 38*

To a mixture consisting of 61 g. (0.28 mole) of phenyltrichlorosilane and 158 g. (0.95 mole) of triethyl phosphite 61 g. (1.05 moles) of propionaldehyde was added portionwise while controlling the temperature of the mixture below 25° C. by cooling in an ice bath. The mixture was heated at 60° C. for two hours and then concentrated to 130° C. at reduced pressure to give a colorless residue that was substantially pure tris-[1-(diethoxyphosphinyl)propoxy]phenylsilane,

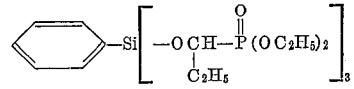

| Percent | Found | Anal. Calcd. for $C_{27}H_{53}O_{12}P_3Si$ |
|---|---|---|
| C | 47.05 | 46.95 |
| H | 8.05 | 7.73 |
| P | 13.33 | 13.42 |
| Si | 3.96 | 4.06 |

*Example 39*

To a mixture of 44 g. (0.326 mole) of trichlorosilane and 166.2 g. (1.0 mole) of triethyl phosphite 64 g. of propionaldehyde was added while controlling the temperature of the reaction mixture at 20° to 25° C. by cooling and stirring. After addition of the aldehyde was complete, the solution was heated at 45° C. for 3 hours and then concentrated at reduced pressure to give 195.2 g. of substantially pure tris[1-(diethoxyphosphinyl)propoxy]silane,

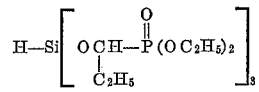

| Percent | Found | Anal. Calcd. for $C_{21}H_{49}O_{12}P_3Si$ |
|---|---|---|
| C | 40.99 | 41.10 |
| H | 7.96 | 8.04 |
| P | 15.16 | 15.12 |
| Si | 4.60 | 4.57 |

*Example 40*

To a mixture consisting of 40 g. (0.211 mole) of diethoxydichlorosilane and 72.3 g. (0.435 mole) of triethyl phosphite 26.7 g. (0.460 mole) of propionaldehyde was added while keeping the temperature of the reaction mixture below 35° C. by cooling. After addition of the aldehyde was completed the mixture was warmed to 100° C. in about 3 hours and then concentrated to 135°

C. to give substantially pure bis[1-(diethoxyphosphinyl)-propoxy]diethoxysilane,

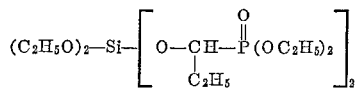

| Percent | Found | Anal. Calcd. for C₁₅H₄₂O₁₀P₂Si |
|---|---|---|
| C | 41.64 | 42.60 |
| H | 8.34 | 8.30 |
| P | 12.29 | 12.18 |
| Si | 5.56 | 5.52 |

*Example 41*

To a mixture consisting of 42.5 g. (0.251 mole) of 1,1-dichlorosilacyclohexane and 92.5 g. (0.560 mole) of triethyl phosphite 35 g. (0.603 mole) of propionaldehyde was added slowly while controlling the temperature of the reaction mixture below 25° C. by cooling. After addition of aldehyde was complete, the mixture was warmed at 60° C. for 3 hours and then concentrated to 100° C. at reduced pressure to give 128.5 g. of crude product. Distillation gave a major fraction with a boiling point of 186–188° C./0.65 mm. which was bis[1-diethoxyphosphinyl)propoxy]silacyclohexane,

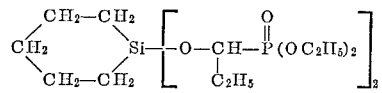

| Percent | Found | Anal. Calcd. for C₁₉H₄₂O₈P₂Si |
|---|---|---|
| C | 46.15 | 46.70 |
| H | 8.63 | 8.65 |
| P | 12.28 | 12.65 |
| Si | 5.97 | 5.74 |

*Example 42*

To a solution of 31 g. (0.118 mole) of 2,2,4-trimethylpentoxytrichlorosilane and 60.7 g. (0.365 mole) of triethyl phosphite 24.7 g. (0.425 mole) of propionaldehyde was added while maintaining the temperature below 30° C. After completing the addition of aldehyde, the mixture was warmed at 60 to 110° C. for 5 hours and then concentrated to 130° C. at reduced pressure to give substantially pure tris[1-(diethoxyphosphinyl)propoxy]2,2,4-trimethylpentoxysilane having the structure

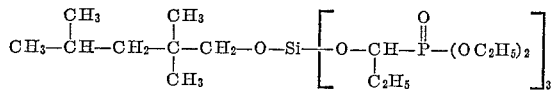

| Percent | Found | Anal. Calcd. for C₂₉H₆₅O₁₃P₃Si |
|---|---|---|
| C | 46.78 | 46.95 |
| H | 8.84 | 8.83 |
| P | 12.45 | 12.50 |
| Si | 3.76 | 3.77 |

*Example 43*

To a mixture of 25 g. (0.0538 mole) of tris(3-phenylpropyl)bromosilane and 22.5 g. (0.0541 mole) of tris(2-ethylhexyl) phosphite 3.7 g. (0.0638 mole) of propionaldehyde was added all at once. The mixture was warmed at 60° C. for 3 hours and at 130° C. for 1 hour and then concentrated to 180° C./0.04 mm. to give substantially pure {1-[bis(2-ethylhexyloxy)phosphinyl]propoxy}tris(3-phenylpropyl)silane,

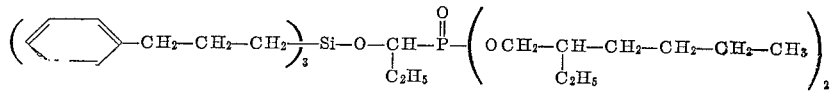

| Percent | Found | Anal. Calcd. for C₄₆H₇₉O₄PSi |
|---|---|---|
| C | 73.68 | 73.75 |
| H | 9.86 | 9.38 |
| P | 4.29 | 4.14 |
| Si | 3.79 | 3.75 |

*Example 44*

To a mixture consisting of 50 g. (0.197 mole) of diphenyldichlorosilane and 67.3 g. (0.404 mole) of triethyl phosphite cooled at 10° to 15° C. there was added 28 g. (0.497 mole) of propionaldehyde while holding the temperature below 25° C. by means of an ice bath. After the addition of aldehyde was completed, the mixture was warmed at 60–100° C. for 2 hours and then concentrated at reduced pressure to give bis[1-(diethoxyphosphinyl)propoxy]diphenylsilane,

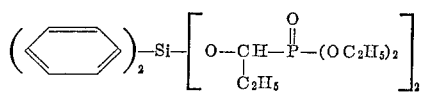

| Percent | Found | Anal. Calcd. for C₂₈H₄₂O₈P₂Si |
|---|---|---|
| C | 54.75 | 54.60 |
| H | 7.42 | 7.39 |
| P | 11.53 | 11.81 |
| Si | 5.13 | 4.90 |

*Example 45*

To a mixture consisting of 216 g. (0.8 mole) of tris-(2-chloroethyl) phosphite and 40.4 g. (0.25 mole) of vinyl-trichlorosilane there was added 44 g. (1.0 mole) of acetaldehyde in 0.3 hour while cooling at 15°–25° C. The solution was then warmed to 85° C. and finally concentrated to 150° C./0.5 mm. to give tris{1-[bis(2-chloroethoxy)phosphinyl]ethoxy}vinylsilane $n_D{}^{25}$ 1.4860, having the structure

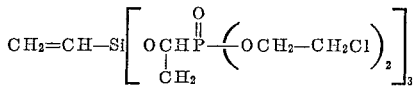

*Example 46*

A mixture of 85 g. (0.50 mole) of silicon tetrachloride and 166.2 g. (1.0 mole) of triethyl phosphite was cooled to about −70° C. With fully Dry Ice cooling, 58.1 g. (1.0 mole) or propionaldehyde was added dropwise while keeping the temperature of the mixture below −60° C. After addition of the aldehyde was completed, the temperature of the mixture was allowed to increase slowly to −50° C. where a moderate exothermic reaction took place. The mixture was cooled until the indicated reaction was completed and the temperature was allowed to rise again until at −35° C. a further exothermic reaction took place. The mixture was cooled to −45° C. until all reaction had ceased. The product, bis[1-(diethoxyphosphinyl)propoxy]dichlorosilane, was then treated with propylene oxide as described in a later example.

*Example 47*

To a mixture consisting of 42.5 g. (0.25 mole) of silicon tetrachloride and 83.1 g. (0.50 mole) of triethyl phosphite cooled to about −70° C. there was added dropwise 29 g. (0.50 mole) of propionaldehyde with stirring. After the addition of aldehyde was completed, the temperature was allowed to increase to −50° C. and then to −35° C. as in the previous example. Upon completion of the reaction, the mixture was again cooled to −70° C. and treated with 62.1 g. (0.50 mole) of trimethyl phosphite and then with 53.1 g. (0.5 mole) of benzaldehyde (dropwise). The temperature increased to −30° C. before reaction occurred. When the temperature was allowed to increase to about room temperature, another exothermic reaction occurred, causing a rise to 55° C. The mixture was then concentrated at 150° C./0.5–0.8 mm. for 1 hour. The residue, 206.5 g. (97.4% yield), was bis[1-(diethoxyphosphinyl)propoxy]-bis[1-(dimethoxyphosphinyl)benzyloxy]silane.

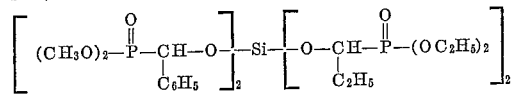

and analyzed as follows:

| Percent | Found | Calcd. for $C_{32}H_{56}O_{16}P_4Si$ |
|---|---|---|
| P | 14.91 | 14.59 |
| Si | 3.51 | 3.30 |
| Cl | 0.00 | 0.00 |

Example 48

A mixture of 74.7 g. (0.5 mole) of methyltrichlorosilane and 155.3 g. (0.5 mole) of tris(2-chloropropyl) phosphite was cooled at −50° C. as 28 g. (0.5 mole) of acrolein was added. The temperature of the reaction mixture was allowed to rise slowly until at −25° C. to −30° C. a vigorous exothermic reaction began and caused the temperature of the mixture to increase to 22° C. even with full Dry Ice cooling. On reaching 22° C., the temperature began to recede. The product was {1-[bis(2-chloropropoxy)phosphinyl] - 2 - propenyloxy}-methyldichlorosilane and propylene dichloride. This mixture analyzed as follows:

| Percent | Found | Calcd. for $C_{13}H_{25}Cl_6O_4PSi$ |
|---|---|---|
| P | 5.90 | 6.00 |
| Si | 5.41 | 5.42 |

Example 49

Benzaldehyde (42.5 g. or 0.40 mole) was added dropwise to a mixture of 51.7 g. (0.40 mole) of dimethyldichlorosilane and 79.4 g. (0.40 mole) diethyl phenylphosphonite at −60° C. The mixture was allowed to warm slowly until at −5° C. a slightly exothermic reaction took place. Thereafter, the temperature was allowed to rise slowly to 29° C. until no further reaction was apparent. The reaction mixture was then subjected to vacuum for 1.25 hours at 0.18 mm. to remove by-product. The residue, substantially pure [α-(ethoxyphenylphosphinyl)benzyloxy]dimethylchlorosilane, was a viscous, clear liquid and analyzed as follows:

| Percent | Found | Calcd. for $C_{17}H_{22}ClO_3PSi$ |
|---|---|---|
| P | 8.97 | 8.41 |
| Si | 7.70 | 7.60 |

Example 50

The purpose of this and the following two examples is to illustrate that those compounds of this invention in which only part of the halogen on the silicon compound reactant has been replaced, i.e., the products containing phosphinylhydrocarbyloxy groups and having halogen still attached to the silicon atom, can be further reacted with other reagents such as epoxides, to give useful products in which all of the halogen has been displaced from the silicon. It also demonstrates a reversal of the order of addition of the reactants involving the use of $RSiX_3$, $R_2SiX_2$, $R_3SiX$ with carbonyl compounds and trivalent phosphorus ester.

To a 157.9 g. (0.256 mole) portion of the product prepared in Example 46, was added 40.6 g. (0.70 mole) of propylene oxide while cooling the mixture to keep the temperature between −5° and 5° C. There was heat of reaction during about two-thirds of the propylene oxide addition. The mixture was warmed at 55–65° C. for 0.5 hour and then concentrated to 110° C./0.3 mm. to give 155.4 g. (100% yield) of bis[1-(diethoxyphosphinyl)propoxy]bis(2-chloropropoxy)silane which analyzed as follows:

| Percent | Found | Calcd. for $C_{20}H_{44}Cl_2O_{10}P_2Si$ |
|---|---|---|
| C | 39.83 | 39.74 |
| H | 7.48 | 7.33 |
| Cl | 11.92 | 11.72 |
| P | 10.03 | 10.24 |
| Si | 4.46 | 4.64 |

Example 51

A 112 g. (0.217 mole) portion of the {1-[bis(2-chloropropoxy)phosphinyl] - 2 - propenyloxy}methyldichlorosilane solution prepared in Example 48 above was placed in a reaction flask and stirred and cooled as 31.5 g. (0.543 mole) of propylene oxide was added in 0.3 hour at 10–20° C. The reaction mixture was warmed to 70° and then concentrated to 115° C./0.01 mm. to give 112.4 g. (100% yield) of {bis(2-chloropropoxy)phosphinyl]-2-propenyloxy}bis(2-chloropropoxy)methylsilane.

Example 52

[α - (Ethoxyphenylphosphinyl)benzyloxy]dimethyl - chlorosilane, 100.3 g. (0.23 mole), prepared in Example 49 above, was placed in a 500 ml. flask and cooled in ice as 20.3 g. (0.35 mole) of propylene oxide was added in 0.2 hour at 10–20° C. The reaction mixture was warmed to 70° C. to insure complete reaction and then concentrated to a pot temperature of 110° C./0.3 mm. to give 97.5 g. (99% yield) of [α-(ethoxyphenylphosphinyl)-benzyloxy]dimethyl(2-chloropropoxy)silane analyzing as follows:

| Percent | Found | Calcd. for $C_{20}H_{28}ClO_4PSi$ |
|---|---|---|
| C | 56.49 | 56.3 |
| H | 6.35 | 6.6 |
| Cl | 8.03 | 8.3 |
| P | 7.26 | 7.3 |

Example 53

This example describes testing of one of the presently provided compounds for use as preignition-inhibiting agents in leaded fuels. It has been established that there is a close relationship between the quantity of a material required to suppress glowing and the effectiveness of the same material for reducing preignition of a leaded fuel in gasoline engines; accordingly, testing of the present compounds was conducted by a glow test method wherein the following procedure was employed.

Test blends were prepared by blending 5 ml. of a fuel consisting of a high boiling (380–420° F.) hydrocarbon fraction containing approximately 130 mg. of lead based on the quantity of a commercial tetraethylleadhalohydrocarbon additive (hereinafter referred to as TEL) which has been incorporated therein and 1 ml. of an SAE 30 grade lubricating oil with graduated precisely weighed quantities of (1) tricresyl phosphate (TCP) additive or (2) tris[1-(diethoxyphosphinyl)ethoxy]methylsilane as compared to a control sample containing no preignition-inhibiting additive. Two milliliters of the test blend was then dropped at a constant rate (1.5±0.1 ml./15 minutes), during a 15–17 minute period, onto a reagent grade decolorizing carbon contained in a crucible maintained in a furnace at a temperature which was high enough to keep the bottom of the crucible at about 1000° F. By using test blends containing progressively lower quantities of the test compound, there was determined the minimum concentration of the test compound at which no glowing of the carbon was evidenced either during the dropping period or after all of the test sample had been added.

Test blend: Amount of additive needed to suppress slow
Control _____ None used-constant glow.
TCP _____ 0.0984 gm./5 ml. of fuel.
Tris[(diethoxyphosphinyl)ethoxy]methylsilane __ 0.0427 gm./5 ml. of fuel.

Instead of the phosphinyl silicon compound shown above, there may be used, for the purpose of effectively inhibiting preignition of leaded fuels, any of the gasoline-soluble compounds provided by the present invention, the data on the above compound being supplied merely by way of illustrating the valuable properties of those of the compounds of the series which are prepared from relatively readily available raw materials. While, as will be obvious to those skilled in the art, the compound to be useful must be present in the gasoline in soluble form, it will also be realized that since the additive is employed in only very low concentrations, gasoline solubility at the useful concentration is possessed by the great preponderance of the presently prepared compounds. Whether the phosphinylhydrocarbyloxy silicon compound is soluble in the gasoline at a concentration which is within the range of, say, from 0.01 to 2.0 volumes per volume of organolead present in the gasoline can be readily ascertained by routine experimentation.

Inasmuch as the crude reaction mixture obtained by the present process comprises an aliphatic halohydrocarbon as by-product, the latter obviously can serve conveniently as the lead scavenger in leaded gasoline fuels containing the presently prepared phosphinyl-silicon compounds.

Leaded gasolines containing the presently prepared compounds are compatible with other additives customarily used in the art, e.g., rust inhibitors, stabilizers, or antioxidants, dyes, etc. Obviously, many variations can be made without departing from the spirit of the invention.

We claim:
1. Compounds of the formula

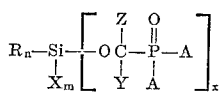

wherein $n$ is a whole number of from 0 to 3, $m$ is a whole number of from 0 to 3, $x$ is a whole number from 1 to 4, and the sum total of $n+m+x$ is always equal to 4; R is selected from the group consisting of hydrogen, hydrocarbyl-, halohydrocarbyl-, hydrocarbyloxy-, halohydrocarbyloxy-, hydrocarbylthio-, and halohydrocarbylthio-radicals of from 1 to 12 carbon atoms, and two R radicals taken together stand for a member of the group consisting of a bivalent —hydrocarbylene— radical having from 4 to 6 carbons in the ring and a total of from 4 to 12 carbon atoms, and a bivalent —OhydrocarbyleneO— radical having from 2 to 4 carbon atoms in the ring and a total of from 2 to 12 carbon atoms; X is a member of the group consisting of bromine and chlorine; Y is selected from the group consisting of hydrogen, hydrocarbyl radicals of from 1 to 12 carbon atoms when $n$ is 0 to 1, furyl- and thienyl-radicals, and said radicals containing a substituent selected from the group consisting of halogen, cyano-, —Oalkyl, —Salkyl, —COOalkyl, where alkyl has from 1 to 5 carbon atoms, and when $n$ is 2 to 3, Y is selected from the group consisting of hydrogen, hydrocarbyl radicals of from 1 to 17 carbon atoms, furyl-, and thienyl-radicals, and said radicals containing a substituent selected from the group consisting of halogen, cyano-, —Oalkyl, —Salkyl, —COOalkyl, where alkyl has from 1 to 5 carbon atoms; Z is selected from the group consisting of hydrogen and the methyl radical and is methyl only when Y is an alkyl radical of from 1 to 2 carbons, and Y and Z taken together complete a cycloalkane ring having from 5 to 6 carbon atoms in the ring and a total of from 5 to 16 carbon atoms; and each A is selected from the group consisting of hydrocarbyl-, hydrocarbyloxy-, halohydrocarbyl-, and halohydrocarbyloxy-radicals which contain from 1 to 12 carbon atoms each.

2. Compounds of the formula

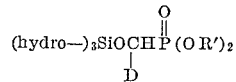

wherein each hydro denotes a hydrocarbyl radical having from 1 to 12 carbon atoms; D is a hydrocarbyl radical having from 1 to 12 carbon atoms, and R' is a hydrocarbyl radical of from 1 to 12 carbon atoms.

3. Compounds of the formula

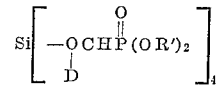

wherein D is a hydrocarbyl radical having from 1 to 12 carbon atoms, and each R' is a hydrocarbyl radical having from 1 to 12 carbon atoms.

4. A compound of the formula

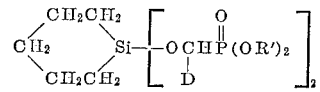

wherein D is a hydrocarbyl radical having from 1 to 12 carbon atoms and each R' is a hydrocarbyl radical having from 1 to 12 carbon atoms.

5. Bis[1 - (diethoxyphosphinyl)ethoxy]dimethylsilane.
6. Tris [ 1 - (diethoxyphosphinyl)ethoxy]cyclohexylsilane.
7. [1 - (diethoxyphosphinyl) - 2 - ethylhexyloxy]triethoxysilane.
8. Bis[1 - (diethoxyphosphinyl)propoxy]methylphenylsilane.
9. Tris[1 - (diethoxyphosphinyl)propoxy] - 2,2,4-trimethylpentoxysilane.
10. {1 - [bis(2 - ethylhexyloxy)phosphinyl]propoxy}-tris-(3-phenylpropyl)silane.
11. Bis [ 1 - (diethoxyphosphinyl)propoxy]dichlorosilane.
12. [α - (diethoxyphosphinyl)furfuryloxy]trimethylsilane.
13. [α - (dimethoxyphosphinyl) - 4 - methylbenzyloxy]-trimethylsilane.
14. [1 - (dihexyloxyphosphinyl)propoxy]trioctylsilane.
15. [1 - (diphenylphosphinyl)propoxy]trimethylsilane.
16. [ 1 - (ethoxyphenylphosphinyl)propoxy]trimethylsilane.
17. Tetra[1 - (diethoxyphosphinyl) - 2 - propenyl]silicate.
18. Bis { α - [bis(2 - chloroethoxy)phosphinyl]benzyloxy}dimethylsilane.
19. Bis [ 1 - diethoxyphosphinyl)propoxy]dihpenylsilane.
20. Bis[1 - (diethoxyphosphinyl)propoxy]silacyclohexane.
21. 1 - (diethoxyphosphinyl)propoxydichloromethyldimethylsilane.
22. Bis[1 - diethoxyphosphinyl)propoxy]allylmethylsilane.
23. [1 - (diethoxyphosphinyl) - 3-carbethoxypropoxy]-trimethylsilane.

24. The method which comprises contacting and reacting a halosilicon compound of the formula $$R_nSiX_{(4-n)}$$

where $n$ is a whole number of from 0 to 3, X is a member of the group consisting of bromine and chlorine, R is selected from the group consisting of hydrogen, and hydrocarbyl-, halohydrocarbyl-, hydrocarbyloxy-, halohydrocarbyloxy-, hydrocarbylthio-, and halohydrocarbylthio- radicals wherein the hydrocarbyl group has from 1 to 12 carbon atoms, and wherein two R radicals taken together stand for a member of the group consisting of a bivalent hydrocarbylene- radical having from 4 to 6 carbons in the ring and a total of from 4 to 12 carbon atoms, and a bivalent —OhydrocarbyleneO— radical having from 2 to 4 carbon atoms in the ring and a total of from 2 to 12 carbon atoms, with a carbonyl compound of the formula $$\begin{array}{c} Z \\ | \\ C=O \\ | \\ Y \end{array}$$

wherein Y is selected from the group consisting of hydrogen, and hydrocarbyl radicals of from 1 to 12 carbon atoms when $n$ is 0 to 1, furyl- and thienyl radicals, and said radicals containing a substituent selected from the group consisting of halogen, cyano- —Oalkyl, —Salkyl, and —COOalkyl where alkyl has from 1 to 5 carbon atoms, and when $n$ is 2 to 3, Y is selected from the group consisting of hydrogen, and hydrocarbyl radicals of from 1 to 17 carbon atoms, furyl- and thienyl-, and said radicals containing a substituent selected from the group consisting of halogen, cyano, —Oalkyl,—Salkyl, —COOalkyl, where alkyl has from 1 to 5 carbon atoms; Z is selected from the group consisting of hydrogen and the methyl radical is methyl only when Y is an alkyl radical of from 1 to 2 carbon atoms, and Y and Z taken together complete a cycloalkane ring having from 5 to 6 carbon atoms in the ring and a total of from 5 to 10 carbon atoms; and a trivalent phosphorus ester of the formula $$\begin{array}{c} A \\ | \\ A-P-OT \end{array}$$

in which T is selected from the group consisting of alkyl and haloalkyl radicals of from 1 to 12 carbon atoms, and each A is selected from the group consisting of hydrocarbyl-, hydrocarbyloxy-, halohydrocarbyl-, and halohydrocarbyloxy- radicals which contain from 1 to 12 carbon atoms each.

25. The method which comprises contacting and reacting a halosilicon compound of the formula $$(hydro)_3SiX$$

wherein X is selected from the group consisting of chlorine and bromine, and each hydro is a hydrocarbyl radical having from 1 to 12 carbon atoms, with an aldehyde of the formula $$\begin{array}{c} H \\ | \\ C=O \\ | \\ D \end{array}$$

wherein D is a hydrocarbyl radical having from 1 to 12 carbon atoms, and a trivalent phosphorus ester of the formula $$TO-P-(OR')_2$$

wherein T is an alkyl radical having from 1 to 12 carbon atoms, and each R' is a hydrocarbyl radical having from 1 to 12 carbon atoms.

26. The method which comprises contacting and reacting silicon tetrachloride with an aldehyde of the formula $$\begin{array}{c} H \\ | \\ C=O \\ | \\ D \end{array}$$

wherein D is a hydrocarbyl radical having from 1 to 12 carbon atoms, and a trivalent phosphorus ester of the formula $$TO-P(-OR')_2$$

wherein T is an alkyl radical having from 1 to 12 carbon atoms, and each R' radical is a hydrocarbyl radical having from 1 to 12 carbon atoms.

27. The method which comprises mixing together allylmethyldichlorosilane, triethyl phosphite, and propionaldehyde and recovering bis[1-(diethoxyphosphinyl)propoxy]-allylmethylsilane.

28. The method which comprises mixing diethoxymethylchlorosilane, triethyl phosphite, and propionaldehyde and recovering 1-(diethoxyphosphinyl)propoxydiethoxymethylsilane.

29. The method which comprises mixing o-chlorobenzaldehyde, trimethylchlorosilane, and triethyl phosphite and recovering α-(diethoxyphosphinyl)-2-chlorobenzyloxytrimethylsilane.

References Cited in the file of this patent

UNITED STATES PATENTS

| | | |
|---|---|---|
| 2,488,449 | Trautman | Nov. 15, 1949 |
| 2,843,615 | Linville | July 15, 1958 |
| 2,851,468 | Snyder | Sept. 9, 1958 |
| 2,870,169 | Dazzi | Jan. 20, 1959 |
| 2,892,691 | Howell | June 30, 1959 |
| 2,897,071 | Gilbert | July 28, 1959 |